(12) United States Patent
Lagrange et al.

(10) Patent No.: US 12,388,565 B2
(45) Date of Patent: Aug. 12, 2025

(54) METHOD AND APPARATUS FOR CONFIGURING NETWORK CODING AND CONTROLLING NETWORK CODING ACTIVATION

(71) Applicant: CANON KABUSHIKI KAISHA, Tokyo (JP)

(72) Inventors: Pascal Lagrange, La Chapelle des Fougeretz (FR); Pierre Visa, Rennes (FR); Philippe Le Bars, Thorigne Fouillard (FR); Romain Guignard, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 298 days.

(21) Appl. No.: 17/925,652

(22) PCT Filed: May 19, 2021

(86) PCT No.: PCT/EP2021/063383
§ 371 (c)(1),
(2) Date: Nov. 16, 2022

(87) PCT Pub. No.: WO2021/234051
PCT Pub. Date: Nov. 25, 2021

(65) Prior Publication Data
US 2023/0198671 A1    Jun. 22, 2023

(30) Foreign Application Priority Data
May 20, 2020   (GB) ...................................... 2007551

(51) Int. Cl.
*H04L 5/00* (2006.01)
*H04L 1/00* (2006.01)

(52) U.S. Cl.
CPC .......... *H04L 1/0075* (2013.01); *H04L 5/0091* (2013.01)

(58) Field of Classification Search
CPC .... H04L 1/0075; H04L 5/0091; H04L 1/0076
See application file for complete search history.

(56) References Cited

U.S. PATENT DOCUMENTS

2009/0034637 A1* 2/2009 Hoshino ............... H04L 1/0003
                                                                370/464
2012/0250742 A1   10/2012 Tiirola
(Continued)

FOREIGN PATENT DOCUMENTS

CN   103368692 A   10/2013
CN   103813413 A    5/2014
(Continued)

OTHER PUBLICATIONS

NPL, Source: Dejan Vurobratovic et al; Title: "Random Linear Network Coding for 5G Mobile Video Delivery"; Date: Feb. 13, 2018. XP081227714; pp. 1-20 (Year: 2018).*
(Continued)

*Primary Examiner* — Fahmida S Chowdhury
(74) *Attorney, Agent, or Firm* — Canon U.S.A., Inc. IP Division

(57) ABSTRACT

The present invention concerns a method of wireless communication between a base station and a user equipment, wherein the method comprises: transmitting, by the base station, a data radio bearer configuration; and transmitting packets according to the data radio bearer configuration between the base station and the user equipment; wherein: the data radio bearer configuration comprises a network coding configuration; and the transmitted packets are transmitted according to the network coding configuration.

21 Claims, 34 Drawing Sheets

(56) References Cited

U.S. PATENT DOCUMENTS

| | | | |
|---|---|---|---|
| 2016/0248621 A1* | 8/2016 | Oulahal | H04L 41/046 |
| 2018/0047284 A1 | 2/2018 | Narasimha | |
| 2018/0279168 A1* | 9/2018 | Jheng | H04L 5/001 |
| 2018/0324642 A1* | 11/2018 | Yu | H04W 36/0055 |
| 2020/0177311 A1* | 6/2020 | Ho | H03M 13/05 |
| 2021/0105342 A1* | 4/2021 | Ballif | H04L 69/164 |
| 2022/0173834 A1* | 6/2022 | Vidal | H04L 1/0076 |
| 2022/0264354 A1* | 8/2022 | Kela | H04L 1/08 |

FOREIGN PATENT DOCUMENTS

| | | |
|---|---|---|
| CN | 104427164 A | 3/2015 |
| CN | 106464340 A | 2/2017 |
| CN | 108476085 A | 8/2018 |
| CN | 108476197 A | 8/2018 |
| CN | 109983747 A | 7/2019 |
| CN | 110663206 A | 1/2020 |
| EP | 3035576 A1 | 6/2016 |
| KR | 20190127914 A | 11/2019 |
| WO | 2009057183 A1 | 5/2009 |
| WO | 2018172136 A1 | 9/2018 |
| WO | 2018204828 A1 | 11/2018 |
| WO | 2019191108 A1 | 10/2019 |
| WO | 2019193519 A1 | 10/2019 |
| WO | 2020210682 A1 | 10/2020 |

OTHER PUBLICATIONS

Random Linear Network Coding for 5G Mobile Video Delivery; Vukobratovic Dejan, et al.; MDPI; Version Apr. 4, 2018 submitted to Information; www.mdpi.com/journal/information; pp. 1-20.

Alcatel-Lucent, R3-082626, Correction of SAE Bearer, 3GPP TSG RAN WG3 Meeting #61bis, Sep. 30-Oct. 3, 2008, Prague, Czech Republic.

Wang Lian et al., Scheduling Scheme for Multi-source Multi-relay Wireless Network Based on Random Linear Network Coding, Journal of Electronics & Information Technology vol. 39, No. 3, Mar. 2017.

Jun Yuan, et al., Proposal for Link Adaptation via Network Coding in IEEE 802.16m, IEEE C802.16m-08/616, IEEE Internet, <URL:http://www.ieee802.org/16/tgm/docs/C80216m-08_616.pdf>, Jul. 7, 2008, pp. 1-17.

* cited by examiner

METHOD AND APPARATUS FOR CONFIGURING NETWORK CODING AND CONTROLLING NETWORK CODING ACTIVATION

CROSS-REFERENCE TO RELATED APPLICATIONS

This application is the National Phase application of PCT Application No. PCT/EP2021/063383, filed on May 19, 2021 and titled "METHOD AND APPARATUS FOR CONFIGURING NETWORK CODING AND CONTROLLING NETWORK CODING ACTIVATION". This application claims the benefit under 35 U.S.C. § 119(a)-(d) of United Kingdom Patent Application No. 2007551.1, filed on May 20, 2020 and entitled "METHOD AND APPARATUS FOR CONFIGURING NETWORK CODING AND CONTROLLING NETWORK CODING ACTIVATION". The above cited patent applications are incorporated herein by reference in their entireties.

FIELD OF THE INVENTION

The present disclosure concerns a method and a device for configuring network coding and controlling network coding activation of a device in a radio communication system. It concerns more particularly data transmission robustness improvement for Ultra Reliable Low Latency Communications (URLLC).

BACKGROUND OF INVENTION

Wireless communication systems are largely deployed to address a wide range of applications, ranging from mobile broadband, massive machine type communications to Ultra Reliable Low Latency Communications (URLLC). Such systems allow a plurality of user equipments (UE) or mobile terminals (MT) to share the wireless medium to exchange several types of data content (e.g. video, voice, messaging . . . ) over a radio access network (RAN) through one or more base stations. Examples of such wireless multiple-access communication systems include systems based on 3rd generation partnership project (3GPP) standards, such as fourth-generation (4G) Long Term Evolution (LTE) or recent fifth-generation (5G) New Radio (NR) systems, or systems based on IEEE 802.11 standards, such as WiFi.

URLLC type of communication is particularly relevant in an Industrial Internet of Things (I-IoT or IIOT or IIoT) environment where communication reliability, and thus communication service availability, is essential to prevent service disruption, while low-latency, which relates to the end-to-end delay of the communication, is required, for instance to avoid introducing downtime of equipments or to ensure predictive deterministic data reception.

Several techniques may be considered to ensure communication reliability, such as Automatic Repeat request (ARQ) or on-demand retransmission schemes based on acknowledge messaging, even though the low-latency requirement would be hardly met.

To reduce this issue, a mechanism of packet duplication is provided, known as Packet Data Convergence Protocol (PDCP) duplication in 3GPP and described in the specification TS 38.323, where the packets are systematically sent and received over two different carrier frequencies instead of one. However, packet duplication is not optimal as it suffers from a lack of coding diversity while doubling the bandwidth requirements.

The introduction of network coding for the RAN communications leads to consider an appropriate signaling between the involved radio devices, i.e. the UE and the base station. In particular the network coding configuration needs to be shared between the UE and the base station prior to the activation of the network coding feature.

Indeed, as a wide range of network coding configurations may be considered, the UE and the base station should agree on the one to select and to apply.

For instance, the network coding scheme, along with the coefficients used to produce the linear combinations and their mapping on the various communication channels, shall be determined and agreed between the base station and the UE, prior to any further network coding activation and potential deactivation.

Several 3GPP specifications document (TS 38.300, TS 37.340, TS 38.323, TS 38.331 . . . ) provide specifications for multi-connectivity or PDCP duplication set-up.

SUMMARY OF THE INVENTION

The present invention has been devised to address one or more of the foregoing concerns. It provides a signalling method to establish a Network Coding (NC) configuration between 5G devices while describing the associated control protocol for the activation and deactivation.

In one embodiment of the invention, the NC configuration is shared in the form of specific fields added in an information element (IE) carried in a Radio Resource Control (RRC) message. In another embodiment on the invention, all or part of the NC configuration may be embedded in a header of the encoded data packets. Other embodiments of the invention cover the combination of the previous embodiments.

In one embodiment of the invention, the Network Coding (NC) activation/deactivation notification is established by means of a specific field added in an information element (IE) carried in one or more RRC messages. In another embodiment on the invention, the NC activation/deactivation command is embedded in a dedicated field of the encoded data packets.

In another embodiment of the invention, the UE may transmit a request for activation/deactivation by sharing status information carried in RRC messages.

The protocol messages used for both NC configuration and NC activation/deactivation processes should belong to a set of messages standardized by 3GPP.

According to a first aspect of the invention, there is provided a method of wireless communication between a base station and a user equipment, wherein the method comprises:
  transmitting, by the base station, a data radio bearer configuration; and
  transmitting packets according to the data radio bearer configuration between the base station and the user equipment;
  wherein:
  the data radio bearer configuration comprises a network coding configuration; and
  the transmitted packets are transmitted according to the network coding configuration.

In an embodiment, the network coding configuration is embedded inside one or more network coding encoded packets.

In an embodiment, the method further comprises:
  receiving by the base station of a configuration acknowledge message to acknowledge the configuration by the user equipment; and initiating packet transmission according to the network coding configuration upon reception of the configuration acknowledge message.

In an embodiment, the network coding configuration comprises an indication on network coding activation status.

In an embodiment, the network coding activation status is an activation command or a deactivation command.

In an embodiment, the network coding configuration comprises an indication related to the transmission mode to be applied for transmitting packets according to the network coding.

In an embodiment, the transmission mode is multi-radio connectivity.

In an embodiment, the transmission mode is carrier aggregation.

In an embodiment, the network coding configuration comprises an information related to the number of logical channels to be used for transmitting packets according to the network coding.

In an embodiment, the network coding configuration comprises an information related to the network coding scheme to be used for transmitting packets according to the network coding.

In an embodiment, the network coding configuration comprises an information related to the network coding coefficient values to be used for transmitting packets according to the network coding.

In an embodiment, the information related to the network coding coefficient values comprises an information related to the number of network coding coefficient values to be used for transmitting packets according to the network coding.

In an embodiment, predefined network coding coefficient values are used to perform network coding when the network coding configuration does not comprise any information related to the network coding coefficient values.

In an embodiment, the information related to the network coding coefficient values comprises an information related to the mapping of network coding coefficient values to logical channels.

In an embodiment, a predefined mapping of network coding coefficient values to logical channels is applied when the network coding configuration does not comprise any information related to the mapping of network coding coefficient values to the logical channels.

In an embodiment, the method further comprises:
selecting of logical channels to be used for network coding.

In an embodiment, the method further comprises:
selecting between carrier aggregation and multi-radio connectivity as a transmission mode for transmitting packets according to the network coding configuration.

In an embodiment, the method further comprises:
selecting a plurality of network coding schemes to be used for transmitting packets according to the network coding.

In an embodiment, the method further comprises:
setting of a plurality of radio link control entities associated with logical channels.

In an embodiment, the method further comprises:
checking by the base station of the need for network coding activation prior to the transmission of a data radio bearer configuration comprising a network coding configuration to the user equipment.

In an embodiment, the method further comprises:
checking by the base station of the feasibility of network coding activation prior to the transmission of a data radio bearer configuration comprising a network coding configuration to the user equipment.

In an embodiment, the base station does not transmit any data radio bearer configuration comprising a network coding configuration when neither carrier aggregation nor multi-radio connectivity transmission mode can be applied between the base station and the user equipment.

In an embodiment, the method further comprises:
receiving by the base station of a status message form the user equipment prior to transmitting a data radio bearer configuration comprising a network coding configuration to the user equipment.

In an embodiment, the status message comprises an information related to the operating status of the user equipment.

In an embodiment, the network coding configuration comprises an information related to network coding deactivation.

In an embodiment, the method further comprises:
deactivating all or part of the radio link control entities previously used for transmitting packets according to network coding.

In an embodiment, the network coding deactivation is conditioned by the monitoring of radio links quality status.

In an embodiment, the monitoring of radio links quality status is performed by the base station.

In an embodiment, the monitoring of radio links quality status is performed by the user equipment and the result of the monitoring is transmitted to the base station prior to network coding deactivation.

In an embodiment, the method further comprises:
sending an acknowledge message by the user equipment to the base station upon reception of the network coding configuration comprising an information related to network coding deactivation from the base station.

In an embodiment, the method further comprises:
sending by the base station of a message comprising an information to notify the activation of the network coding configuration to the user equipment.

In an embodiment, the information to notify the activation of the network coding configuration is embedded in the network coding configuration.

In an embodiment, the information to notify the activation of the network coding configuration comprises an information related to the first data packet to be transmitted according to the network coding configuration.

In an embodiment, the information to notify the activation of the network coding configuration is embedded in a data packet.

In an embodiment, the information to notify the activation of the network coding configuration is embedded in a Packet Data Convergence Protocol header of the data packet.

In an embodiment, the method further comprises:
sending by the base station of an information to notify the deactivation of the network coding configuration to the user equipment.

In an embodiment, the information to notify the deactivation of the network coding configuration is embedded in the network coding configuration.

In an embodiment, the information to notify the deactivation of the network coding configuration comprises an information related to the last data packet to be transmitted according to the network coding configuration.

In an embodiment, the information to notify the deactivation of the network coding configuration is embedded in a data packet.

In an embodiment, the information to notify the deactivation of the network coding configuration is embedded in a packet data convergence protocol header of the data packet.

In an embodiment, the radio bearer configuration is transmitted to the user equipment through a radio resource control message.

In an embodiment, the acknowledge message is transmitted through a radio resource control message.

In an embodiment, the message comprising an information to notify the activation of the network coding configuration to the user equipment is sent through a radio resource control message.

In an embodiment, the message comprising an information to notify the deactivation of the network coding configuration to the user equipment is sent through a radio resource control message.

According to another aspect of the invention, there is provided a system of wireless communication between a base station and a user equipment, wherein the base station and the user equipment comprise processors configured for:
 transmitting, by the base station, a data radio bearer configuration; and
 transmitting packets according to the data radio bearer configuration between the base station and the user equipment;
wherein:
 the data radio bearer configuration comprises a network coding configuration; and
 the transmitted packets are transmitted according to the network coding configuration.

According to another aspect of the invention, there is provided a computer program product for programmable devices, the computer program product comprising a sequence of instructions for implementing a method according to the invention, when loaded into and executed by the programmable devices.

According to another aspect of the invention, there is provided a computer-readable storage medium storing instructions of a computer program for implementing a method according to the invention.

According to another aspect of the invention, there is provided a computer program which upon execution causes the method of the invention to be performed.

According to another aspect of the invention, there is provided a base station device for wireless communication between the base station and a user equipment, wherein the base station device comprises a processor configured for:
 transmitting, to the user equipment, a data radio bearer configuration; and
 exchanging packets according to the data radio bearer configuration with the user equipment;
wherein:
 the data radio bearer configuration comprises a network coding configuration; and
 the exchanged packets are transmitted according to the network coding configuration.

According to another aspect of the invention, there is provided a user equipment device for wireless communication between a base station and the user equipment, wherein the user equipment device comprises a processor configured for:
 receiving, from the base station, a data radio bearer configuration; and
 exchanging packets according to the data radio bearer configuration with the base station;
wherein:
 the data radio bearer configuration comprises a network coding configuration; and
 the exchanged packets are transmitted according to the network coding configuration.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF THE INVENTION

Figure 1:
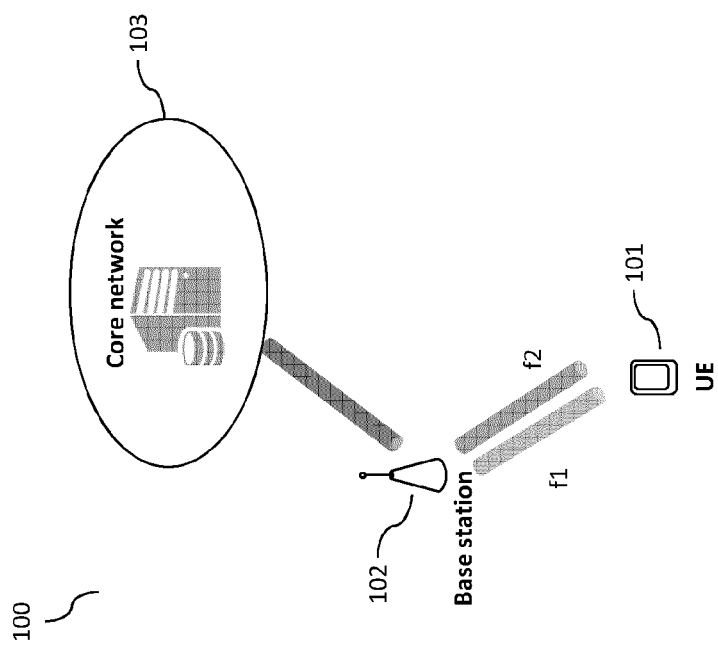
FIG. 1 illustrates a radio access network (RAN) topology with carrier aggregation allowing the operation of a network coding scheme.

FIG. 1 illustrates a radio access network (RAN) topology with carrier aggregation allowing the operation of a network coding scheme.

It presents an example of a wireless communication system 100, such as a 5G NR (New Radio) network that may benefit from the invention. The wireless communication system includes User Equipment (UE) 101, and a base station 102, which may communicate wirelessly with the UE. Several other UEs, and other bases stations not represented on the figure, may also be part of this system. The wireless communication system may be a New Radio (NR) network, a Long term Evolution (LTE) network or a LTE-Advanced (LTE-A) network. The base station may refer, without limitation, to a radio transceiver, an eNodeB (eNB) or a next-generation Node B (gNB). UE 101 may be capable of communicating with any kind of base station or with a limited type of base station through the Radio Access Network (RAN).

Base station 102 is connected to the core network 103, which may be, for instance, a 5G Core (5GC) or an Evolved Packet Core (EPC). The connection between the base station and the core network entities may be either wired or wireless.

Carrier aggregation (CA) mechanism may be implemented, allowing UE 101 and base station 102 to communicate simultaneously over two different component carrier frequencies denoted f1 and f2. The radio cell defined by the coverage area of f1 is called the Primary Cell, while f2 defines a secondary cell.

Carrier aggregation has been introduced in 4G/LTE standards and enhanced in 5G NR. Other wireless communication standards, such as the latest WiFi generations, also rely on such mechanism. The first objective of carrier aggregation is to increase the data rate per user by transmitting different data over multiple frequency blocks, also referred to as component carriers. Carrier aggregation may be applied to both downlink (DL) transmissions, from base station to UE, and uplink (UL) transmissions, from UE to base station.

One other benefit of carrier aggregation is to offer both time and frequency diversity to error correcting schemes, such as packet duplication or network coding.

According to the PDCP duplication method, data coming from the core network 103 are transmitted in the form of Protocol Data Units (PDUs) by base station 102 to UE 101 over one component carrier frequency f1, while a copy of these PDUs are transmitted to UE 101 over a different component carrier frequency f2, simultaneously or not.

In the context of network coding, according to some embodiments of the invention, a first set of linear combinations may be transmitted over f1, while a second set of linear combinations may be transmitted over f2. In some embodiments of the invention, the transmission of linear combinations does not rely on Carrier Aggregation i.e. the linear combinations are sent on the same frequency but it is not optimal as the system loses frequency diversity.

Figure 2:
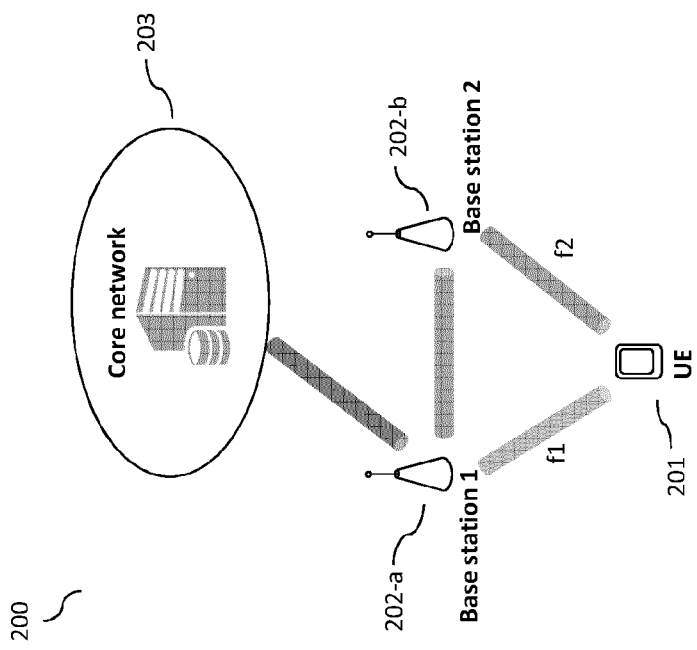
FIG. 2 illustrates a radio access network (RAN) topology with dual-connectivity allowing the operation of a network coding scheme.

FIG. 2 illustrates a radio access network (RAN) topology with dual-connectivity allowing the operation of a network coding scheme.

The figure presents a wireless communication system 200, such as a 5G NR (New Radio) network, that may benefit from the invention. The wireless communication system includes User Equipment (UE) 201, and two base stations 202-a and 202-b, which may communicate wirelessly with the UE. Several other UEs, not represented on the figure, may also be part of this system. The wireless communication system may be a New Radio (NR) network, a Long term Evolution (LTE) network or a LTE-Advanced (LTE-A) network. Each of the base station may refer, without limitation, to a radio transceiver, an eNodeB (eNB)

or a next-generation Node B (gNB). UE 102 may be capable of communicating with any kind of base stations or with a limited type of base stations.

Base stations 202-a and 202-b are connected to core network 203, which may be, for instance, a 5G Core (5GC) or an Evolved Packet Core (EPC). The connection between the base stations and the core network entities, as well as the connection between the two base stations, may be either wired or wireless.

Dual-connectivity (DC) mechanism may be implemented, where UE 201 and base station 202-a communicate directly using the f1 frequency band, and where UE 201 also communicates with base station 202-a through base station 202-b using f2 frequency band. In this particular configuration, base station 202-a is referred to as the master node (MN) while f1 frequency band defines a Master Cell Group (MCG). Base station 202-b is referred to as the secondary node (SN) and f2 frequency band defines a Secondary Cell Group (SCG).

In some embodiments, f1 frequency and f2 frequency may be the same.

Similar to Carrier aggregation (CA), Dual Connectivity (DC) has been introduced by 3GPP in 4G/LTE standards and enhanced in 5G NR, with the objective to increase user throughput, provide mobility robustness, and support load-balancing amongst base stations. It is applicable to both downlink (DL) and uplink (UL) transmissions.

The other benefit of DC is to offer not only time and frequency diversity, but also spatial diversity to error correcting schemes, such as packet duplication or network coding.

According to the PDCP duplication method, data coming from core network 203 are transmitted in the form of Protocol Data Units (PDUs) directly by base station 202-a to UE 201 via the MCG, while a copy of these PDUs are transmitted by base station 202-a to the base station 202-b, which forwards these PDUs to the UE 201 via the SCG. At protocol level, it is said that each PDU is transmitted over a split Data Radio Bearer (DRB), or split bearer, where the same DRB is used on both the MCG and SCG (it is actually split between the MCG and the SCG).

Similarly, in the context of network coding, according to some embodiments of the invention, a first set of linear combinations is transmitted directly by base station 202-a to the UE 201, while a second set of linear combinations is transmitted by base station 202-a to UE 201 through base station 202-b.

FIG. 1 and FIG. 2, illustrate two possible communication channels (also referred to as legs) between a base station and a UE. However, the one skilled in the art knows that 5G NR specifications does not limit CA and DC to two legs. More legs may be available by adding other component carriers in CA, or by adding secondary base stations in DC. As a generalization, a multi-connectivity scheme can be established between a UE and a base station that would involve a plurality of additional base stations. Details on Carrier aggregation (CA) and Dual Connectivity (DC) are available in the specifications documents TS 38.300 and TS 37.340.

Figure 3:
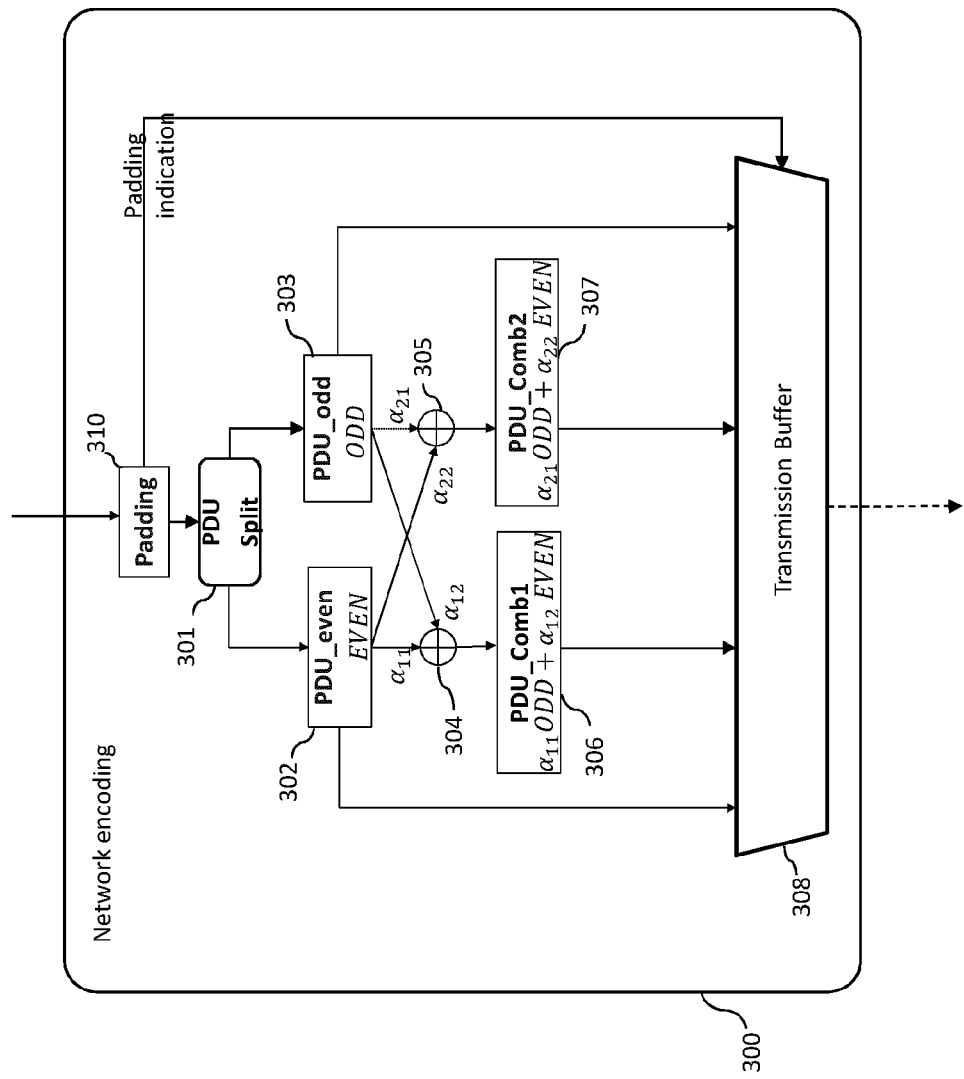
FIG. 3 illustrates an example of network coding scheme with the operations on the transmitter side.

FIG. 3 illustrates an example of network coding scheme with the operations on transmitter side.

It presents an example of network coding scheme, focusing on the encoding aspect of network coding, to be performed by a NC encoder module 300. An incoming PDU is first processed by a padding function 310. If the length of the incoming PDU is odd, one byte of dummy data (all zeroes for example) is appended to the PDU and the padding indication is set as an input for the transmission buffer 308 also in charge of headers processing. The PDU is then processed by PDU splitter 301, which splits the PDU into two parts.

The split may be performed in many different ways. One way to perform the split action is to divide a PDU into two parts of equal size: the (PDU_length/2) first bytes are placed in a so-called even packet, also referred to as EVEN PDU, or EVEN, while the following bytes are gathered in a so-called odd packet, also referred to as ODD PDU, or ODD. As an example of other implementation 1 byte every 2 bytes can be sorted and placed in the EVEN and ODD PDUs. The one skilled in the art may consider other split schemes.

The two parts are stored in buffer 302 for the EVEN PDU, and in buffer 303 for the ODD PDU. Splitting the PDU into two parts is beneficial as reducing the length of transmitted packets reduces the probability of having one bit corrupted during the transmission. Therefore, this also reduces the need for retransmissions that would result from the reception of a corrupted packet.

Through the transmission buffer 308, 4 PDUs will be output. EVEN, ODD, and two PDUs resulting from combinations of EVEN and ODD. The first combined packet, referred to as COMB1 and stored in buffer 306, results from the addition byte to byte of the result of byte to byte multiplications by two different coefficients $\alpha_{11}$ and $\alpha_{12}$ of the bytes within ODD and EVEN (performed by multiply and add unit 304). The second combined packet, referred to as COMB2 and stored in buffer 307, results from the addition byte to byte of the result of byte to byte multiplications by two different coefficients $\alpha_{21}$ and $\alpha_{22}$ of the bytes within ODD and EVEN (performed by multiply and add unit 305).

In some embodiments of the invention, (but non limitative), the operations are made in the Galois Field GF256. Not all sets of 4 coefficients in GF 256 can be used. A plurality of ones and zeros must be excluded, as they would let the original data unchanged and ($\alpha_{11} \times \alpha_{12}$) shall not be equal to ($\alpha_{21} \times \alpha_{22}$), otherwise the linear combinations would be identical.

A sequence number may also be assigned in transmission buffer 308. The format of such sequence number may be (4n+t), where t belongs to {0, 1, 2, 3}. For instance, the sequence number of any ODD PDU will be in the form 4n (t=0), the sequence number of any EVEN PDU will be in the form (4n+1), the sequence number of any COMB1 PDU will be in the form (4n+2), and the sequence number of any COMB2 PDU will be in the form (4n+3).

Eventually, the four encoded PDUs—i.e. ODD, EVEN, COMB1 and COMB2—are transmitted over different legs (see also FIG. 1 and FIG. 2). For instance ODD and COMB1 are transmitted on a first leg, while EVEN and COMB2 are transmitted on the second leg.

Figure 4:
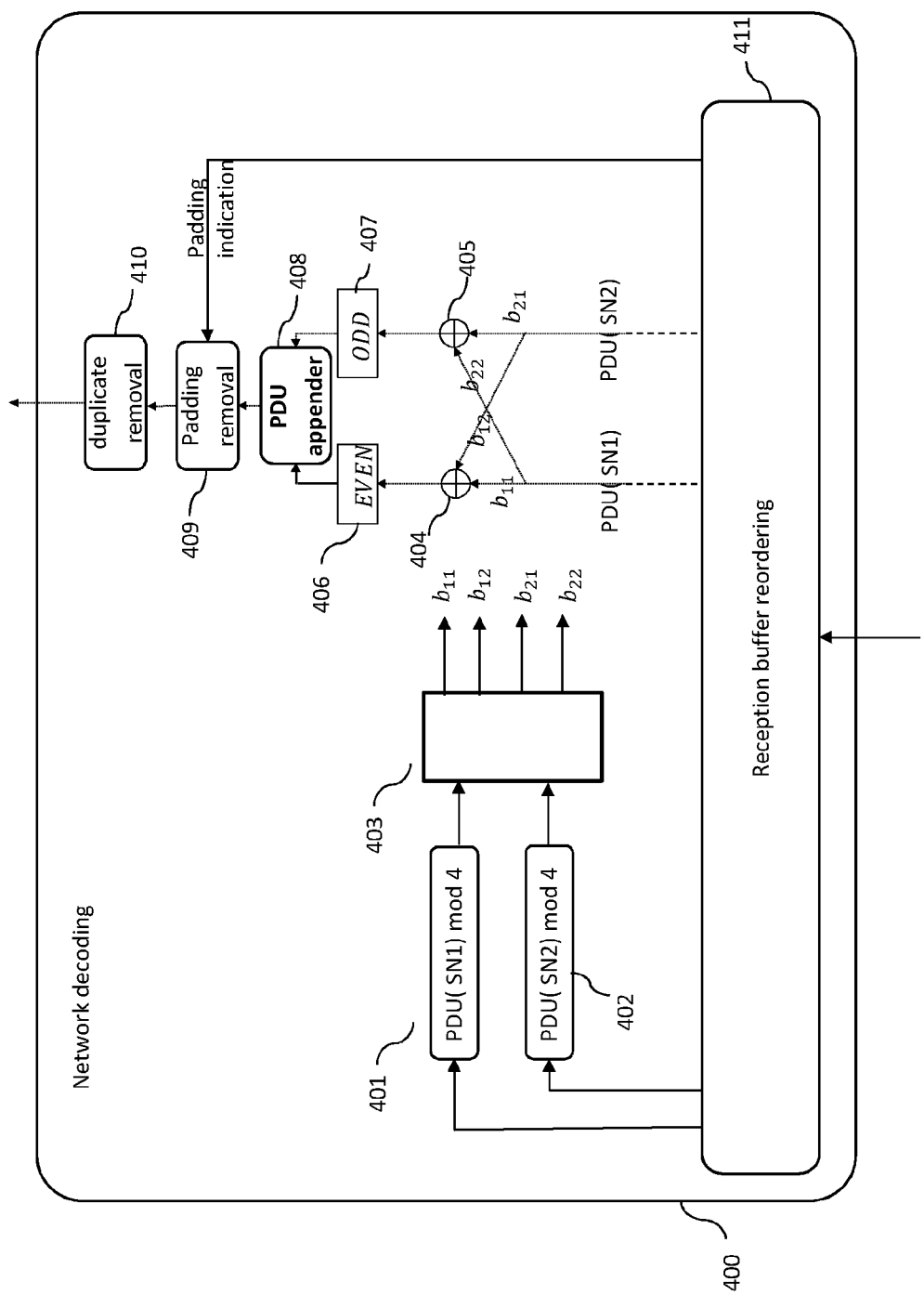
FIG. 4 illustrates an example of network coding scheme with the operations on the receiver side (following the encoding operations depicted in the FIG. 3).

FIG. 4 illustrates an example of network coding scheme with the operations on the receiver side corresponding to the encoding operations depicted in FIG. 3.

This example focuses on the decoding aspect of network coding, to be performed by a NC decoder module 400.

Each received encoded PDU (ODD, EVEN, COMB1, or COMB2) goes to reception buffer 411. Padding indication associated to the received PDU may be extracted and passed to the padding removal function 409. In reception buffer 411, the received PDUs may be reordered according to their sequence number. Any sequence number divided by 4 produces a quotient n and a remainder r. Any two PDUs sharing the same quotient n (i.e. any two out of EVEN, ODD, COMB1 and COMB2) are sufficient to reconstruct the original PDU. According to the remainders calculated in the modules 401 and 402 of any two received PDUs, a specific set of 4 coefficients ($b_{11}$, $b_{12}$, $b_{21}$ and $b_{22}$) is needed to reconstruct the packet. Example: if ODD and EVEN were received, the coefficients will be the identity matrix ($b_{11}=1$, $b_{12}=0$, $b_{21}=0$ and $b_{22}=1$).

The remainders out of module 401, also referred to as Rem(SN1), and out of module 402, also referred to as Rem(SN2), of any pair of received PDUs are thus the inputs of a lookup table 403.

Description of the lookup table 403:

Each byte of the 2 received encoded PDUs, respectively byte(SN1,x) and byte(SN2,x), x indicating the position of the byte in the packet, will form a vector $$\begin{pmatrix} \text{byte }(SN1, x) \\ \text{byte }(SN2, x) \end{pmatrix}.$$

This vector will be multiplied by a matrix M, the result being the 2 parts corresponding to the original PDU. 6 cases usually happen:

1$^{st}$ case) EVEN is received, ODD is received. Rem(SN1)=0 and Rem(SN2)=3, the matrix M is thus the identity matrix;

2$^{nd}$ case) EVEN is received, COMB1 is received. Rem(SN1)=0 and Rem(SN2)=1, the matrix M is the invert of $$\begin{pmatrix} 1 & 0 \\ \alpha_{1,1} & \alpha_{1,2} \end{pmatrix},$$

that is $$\begin{pmatrix} 1 & 0 \\ \alpha_{1,1}/\alpha_{1,2} & 1/\alpha_{1,2} \end{pmatrix},$$

$\alpha_{1,1}$ and $\alpha_{1,2}$ being the coefficients used by the encoding engine 303 of the transmitter, as described in FIG. 3;

3$^{rd}$ case) EVEN is received, COMB2 is received. Rem(SN1)=0 and Rem(SN2)=2, the matrix M is the invert of $$\begin{pmatrix} 1 & 0 \\ \alpha_{2,1} & \alpha_{2,2} \end{pmatrix}$$

that is $$\begin{pmatrix} 1 & 0 \\ \alpha_{2,1}/\alpha_{2,2} & 1/\alpha_{2,2} \end{pmatrix},$$

$\alpha_{2,1}$ and $\alpha_{2,2}$ being the coefficients used by the encoding engine 303;

4$^{th}$ case) ODD is received, COMB1 is received. Rem(SN1)=1 and Rem(SN2)=3, the matrix M is the invert of $$\begin{pmatrix} \alpha_{1,1} & \alpha_{1,2} \\ 0 & 1 \end{pmatrix}$$

that is $$\begin{pmatrix} 1/\alpha_{1,1} & \alpha_{1,2}/\alpha_{1,1} \\ 0 & 1 \end{pmatrix},$$

$\alpha_{1,1}$ and $\alpha_{1,2}$ being the coefficients used by the encoding engine 303;

5$^{th}$ case) ODD is received, COMB2 is received. Rem(SN1)=2 and Rem(SN2)=3, the matrix M is the invert of $$\begin{pmatrix} \alpha_{2,1} & \alpha_{2,2} \\ 0 & 1 \end{pmatrix}$$

that is $$\begin{pmatrix} 1/\alpha_{2,1} & \alpha_{2,2}/\alpha_{2,1} \\ 0 & 1 \end{pmatrix},$$

$\alpha_{2,1}$ and $\alpha_{2,2}$ being the coefficients used by the encoding engine 303;

6$^{th}$ case) COMB1 is received, COMB2 is received. Rem(SN1)=1 and Rem(SN2)=2, the matrix M is the invert of $$\begin{pmatrix} \alpha_{1,1} & \alpha_{1,2} \\ \alpha_{2,1} & \alpha_{2,2} \end{pmatrix}$$

that is $$\frac{1}{\alpha_{1,1}\alpha_{2,2} + \alpha_{2,1}\alpha_{1,2}} \begin{pmatrix} \alpha_{2,2} & \alpha_{1,2} \\ \alpha_{2,1} & \alpha_{1,1} \end{pmatrix},$$

$\alpha_{1,1}$, $\alpha_{1,2}$, $\alpha_{2,1}$ and $\alpha_{2,2}$ being the coefficients used by the encoding engine 303.

Though the probability of the following event is very low, it may happen that only one out of the 4 possible encoded PDUs is received. In such case, the process will not retrieve the original PDU which is lost (or a retransmission could be requested).

The matrices are given as a preferred choice as the decoding complexity is reduced thanks to the use of coefficients belonging to the set {0,1}. However, any choice of 4 pairs of linearly independent vectors would be acceptable. The matrix operations are performed by "multiply and add" units 404 and 405. The results are stored in buffers 406 and 407 before being appended by the module 408 to reconstruct the original PDU. Extra-padding may be removed in module 409. Finally, module 410 removes the duplicated PDUs, as it may happen that more than 2 encoded PDUs sharing the same quotient are received.

Figure 5:
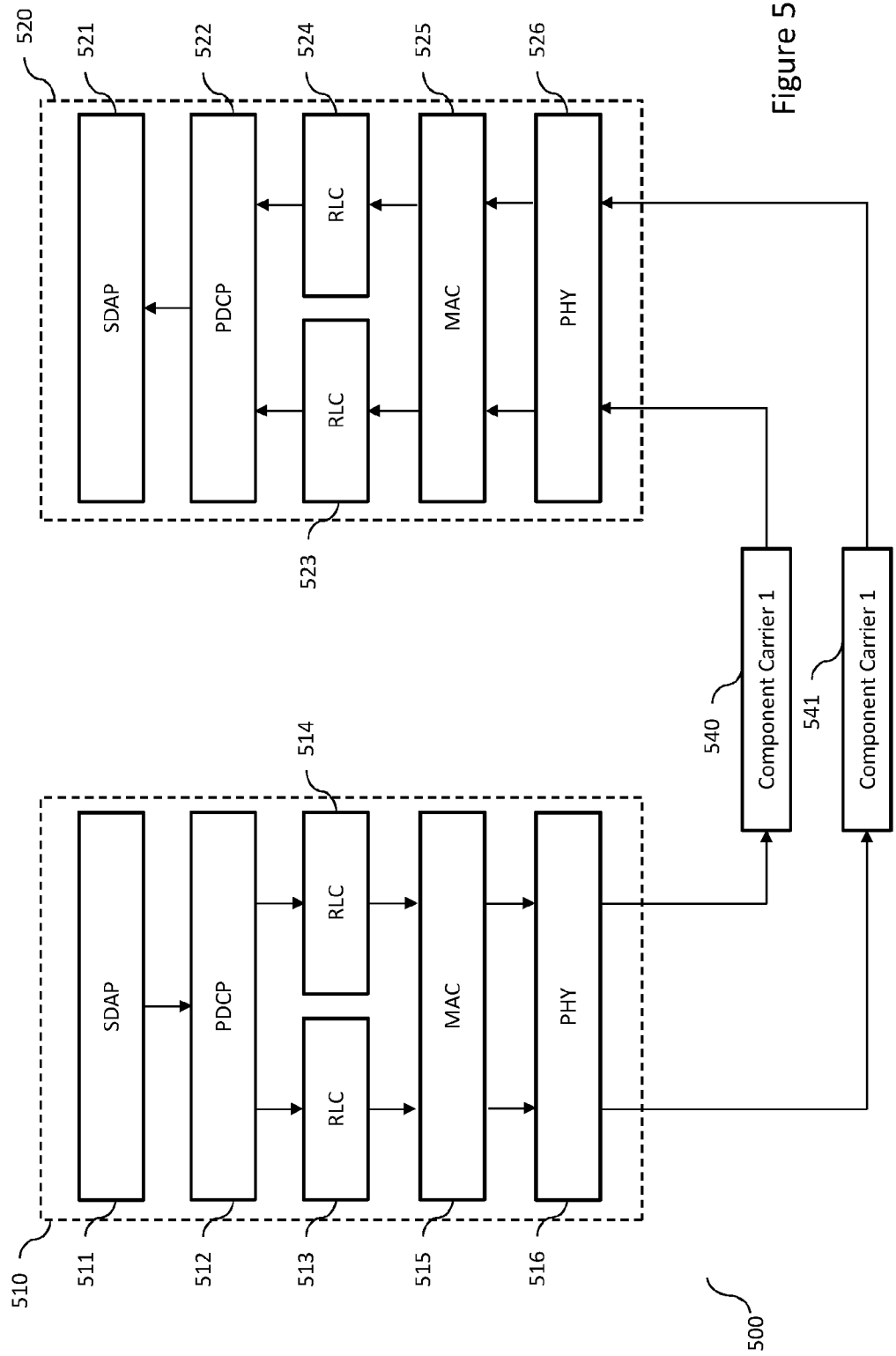
FIG. 5 illustrates a block diagram that supports a downlink or uplink transmissions with carrier aggregation.

FIG. 5 illustrates a block diagram illustrating the protocol stack used in a downlink or uplink transmission with carrier aggregation.

Wireless communication systems may be packet oriented networks that operate using layers of protocols, stacked one upon another. In our case, the protocols for exchanging control packets and data packets are independent, meaning that there is a control plane independent of a user data plane. Both planes use identical layers, but the stacks differ. The user data plane may be made of a SDAP layer, a PDCP Layer, an RLC Layer, a MAC Layer. The control data plane may be made of an RRC layer, a PDCP Layer, an RLC Layer, a MAC Layer. The FIG. 5 represents the protocol stack taking care of a user data packet. The stack is made of, on the transmitter side 510, a SDAP layer 511, a PDCP layer 512, RLC layers 513 and 514, a MAC layer 515, and a PHY layer 516. On the receiver side 520, one finds the same stack that handles the incoming data packets, in the reverse order. First the PHY layer 526, then the MAC Layer 525, the RLC layers 523 and 524, the PCDP Layer 522, and finally the SDAP layer 521. The PHY layer at transmitter side 516 provides an electrical interface to the transmission medium (the air) by converting the stream of information into physical modulation signals, modulating a carrier frequency and, on the receiver side 526, does the reverse, providing an interface from the medium to electrical signals by demodulation and frequency down shifting. The PHY layer is described in TS38.201, TS38.211, TS38.212, TS38.213, TS38.214.

The MAC (Media Access Channel) 516 protocol is responsible for selecting available transmission formats for the user data and for the mapping of logical channels to the transport channels. The MAC handles also a part of the Hybrid Automated Repetition request scheme. The MAC layer is described in TS38.321. The MAC encapsulates the data packets issued from the RLC layers 513 and 514. It adds a header carrying information necessary to the MAC function.

The MAC on the receiver side 525 receives data from the PHY layer 526 and removes the MAC header. It passes the data to the RLC layers.

The RLC (Radio Link Control) layer 513 or 514 is responsible for the segmentation of user data packets issued from the PDCP layer in order to make them suitable for the transport format selected by the MAC. It may add a header carrying information necessary to the RLC function. It is also responsible for requesting retransmissions of missing packets, if a mode different from the transparent mode is selected. It has to be noted that these requests are made through ACK/NACK signalling and Buffer Status Request (BSR) sent backward. ACK/NACK indicates which packets were received or not received, Buffer Status in answer to the BSR indicates which packets are still to be successfully sent and received. The RLC layer is described in TS38.322. There are as many RLC layer instantiations as there are carrier frequencies (also referred as component carriers). In Carrier Aggregation, RLC layers pass or receive their egress/ingress packets to only one MAC entity.

The RLC layers on the receiver side 523 and 524 receive data from the MAC layer. An RLC layer manages the ACK/NACK packets necessary to create a retransmission. The carrier frequencies could present different quality of transmissions due to different propagations, hence the necessity to have a plurality of RLCs as the modulation and retransmission may differ. The RLC at receiver side also handles the segmentation and recreates PDCP PDUs before passing them to the PDCP layer.

The Packet Data Convergence Protocol (PDCP) layer 512 (Tx)/522 (Rx) handles IP Header compression/decompression, ciphering/deciphering and integrity of the user data packets while a control packet passes by, but mandatorily numbers the packets on the emitter side, and reorders the received packets on the receiver side. The PDCP layer is described in TS38.323. The PDCP encapsulates (when placed on the transmission path)/de-encapsulates (when placed on the reception path) the user data packets issued from or sent to the above SDAP layer, or the control packets issued from or sent to the RRC layer. It adds/removes a header carrying information necessary to the PDCP function, which comprises a sequence number, a control/data identification bit, and a PDU type information when the control bit is set. The PDCP may pass or receive its egress/ingress packets to a multiplicity of RLC layer entities in multi-connectivity modes (Carrier Aggregation/Multi Connectivity with up to four legs).

A SDAP (Service Data Adaptation Protocol) layer 511 or 521 handles the Quality of Service. The SDAP layer is described in TS38.324. This layer exists only in the User Data Plane of 5G NR. The QoS in the 5G NR is flow-based. Packets are classified and marked with a QoS Flow Identifier (QFI). The 5G QoS flows are mapped in the RAN to Data Radio Bearers (DRBs). In 5G NR, a Radio Bearer, or Data Radio Bearer, corresponds to the use of resources implementing the protocols (PDCP, RLC, MAC) and the PHY layer. A Data Radio Bearer may carry several data flows if they belong to the same class of QoS. The role of the SDAP layer is to attribute a radio bearer to one or many QoS flows.

In Carrier Aggregation, the user data are transmitted upon 2 or more Component Carriers, here represented by 540 and 541. Component Carriers have different frequencies, and may have different bandwidths, different propagations, resulting into different throughputs. As said above, managing these differences requires several RLC layers. However, the same MAC layer handles the transmission flow.

Figure 6:
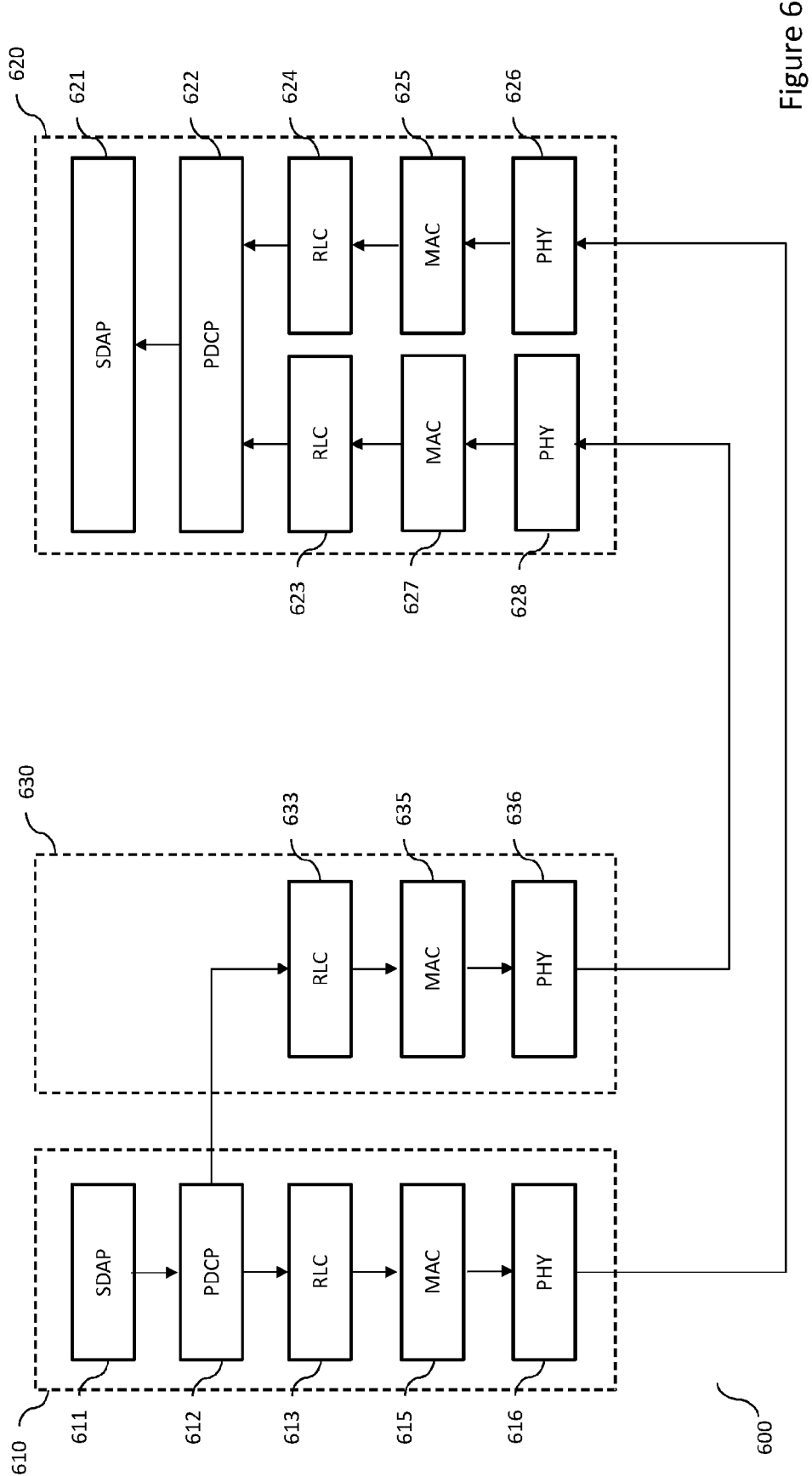
FIG. 6 illustrates a block diagram that supports downlink transmissions with dual-connectivity.

FIG. 6 illustrates a block diagram illustrating the protocol stack for downlink transmissions with dual-connectivity.

A first base station 610 (Master) operates a first protocol stack in transmission comprising a SDAP layer 611, a PDCP layer 613, an RLC layer 613, a MAC layer 615 and a PHY layer 616. This base station may belong to a 4G/LTE network or a 5G NR network. A second base station 630 (Secondary), belonging to a 5G NR network, comprises an RLC layer 633, a MAC layer 635 and a PHY layer 636. The RLC layers 613 and 633 get their PDUs from the same PDCP layer 613, forming what is called a split bearer.

In the UE 620, handling the received packets requires a duplication of some functions, and hence 2 independent partial stacks are used. A first partial stack comprises the PHY layer 628, the MAC layer 627 and the RLC layer 623. A second partial stack comprises the PHY layer 626, the MAC layer 625 and the RLC layer 624. The 2 RLC layers 623 and 624 pass their PDUs to the same PDCP layer 622. This PDCP layer 622 will be responsible for removing the duplicated packets prior to pass them to the SDAP layer 621.

In case more than two legs are used (multi-connectivity mode), there are as many partial stacks (PHY, MAC, RLC) as the number of legs.

Figure 7:
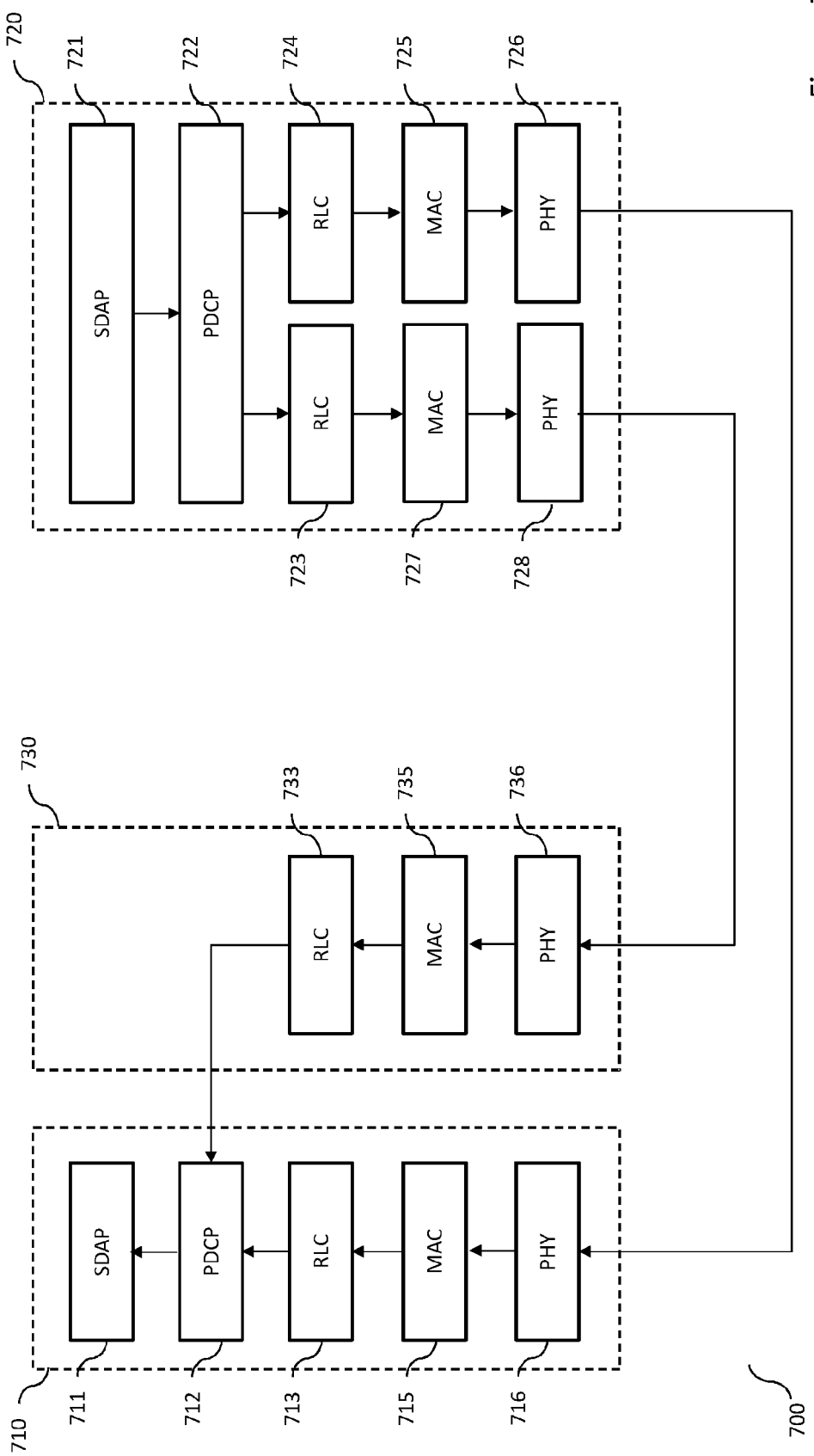
FIG. 7 illustrates a block diagram that supports uplink transmissions with dual-connectivity.

FIG. 7 illustrates a block diagram illustrating the protocol stack for uplink transmissions with dual-connectivity.

A first base station 710 operates a first protocol stack in reception comprising a SDAP layer 711, a PDCP layer 712, an RLC layer 713, a MAC layer 715 and a PHY layer 716. This base station may belong to a 4G/LTE network or a 5G NR network. A second base station 730, belonging to a 5G NR network, comprises an RLC layer 733, a MAC layer 735 and a PHY layer 736. The RLC layers 713 and 733 send their PDUs to the same PDCP layer 712. This PDCP layer 712 will be responsible for removing the duplicated packets prior to pass them to the SDAP layer 711.

In the UE 720, handling the packets to transmit requires a duplication of some functions, and hence 2 independent partial stacks are used. A first partial stack comprises the PHY layer 728, the MAC layer 727 and the RLC layer 723.

A second partial stack comprises the PHY layer 726, the MAC layer 725 and the RLC layer 724. The 2 RLC layers 723 and 724 receive their PDUs from the same PDCP layer 722, forming what is called a split bearer.

In case more than two legs are used (multi-connectivity mode), there are as many partial stacks (PHY, MAC, RLC) as the number of legs.

Figure 8:
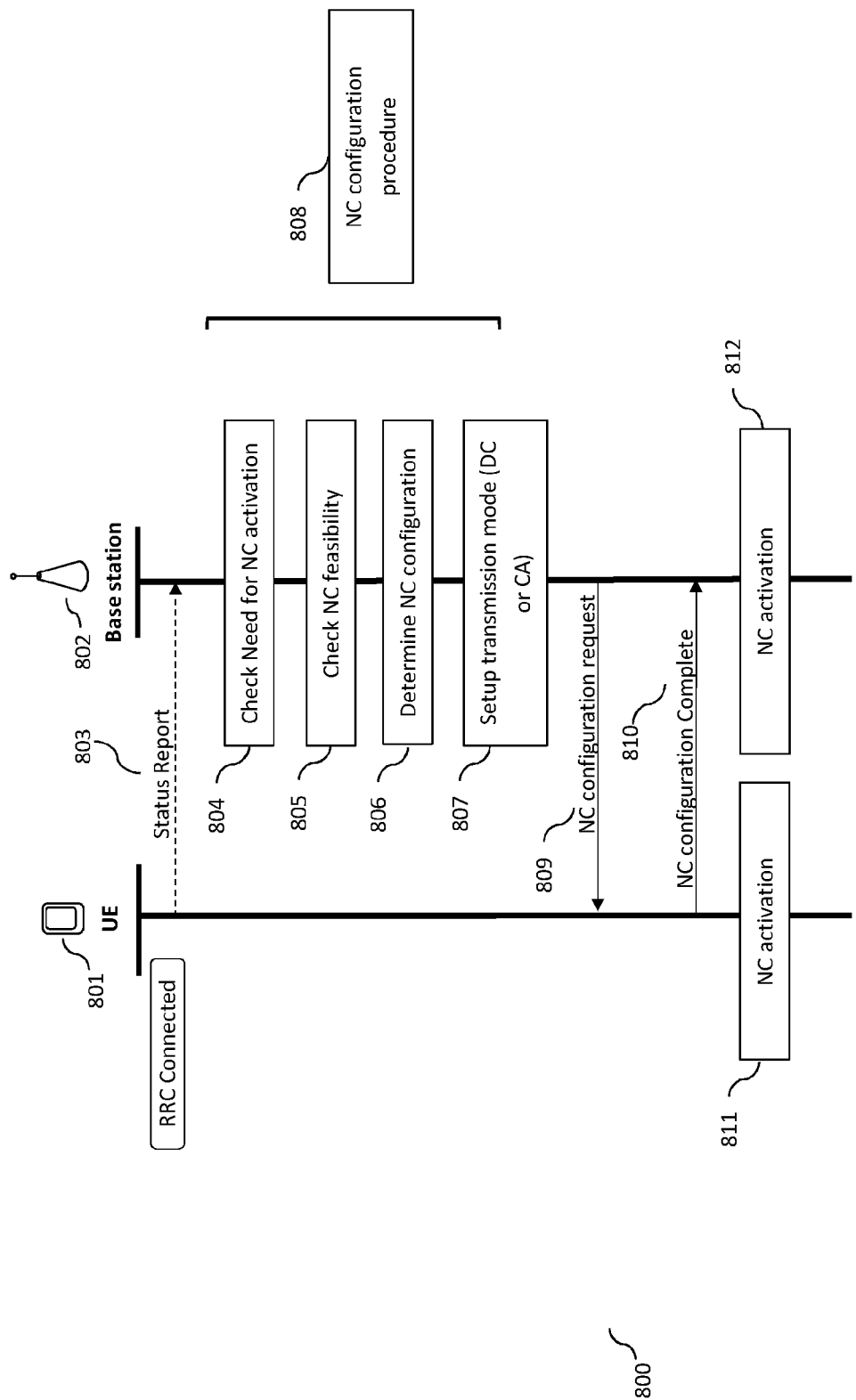
FIG. 8 illustrates an example of process flow that supports the NC configuration and activation process according to one embodiment of the invention.

FIG. 8 illustrates an example of process flow 800 that supports the NC configuration and activation process according to one embodiment of the invention.

It assumes that a UE 801 is in RRC connected state as defined in TS 38.331, meaning that UE 801 is connected to a base station 802 (which may be a gNB in a 5G NR network). Signalling radio bearers are established between base station 802 and UE 801. The UE 801 is also registered in the core network entity not represented on the figure.

According to one embodiment of the invention, UE 801 refers to UE 101 of FIG. 1 or UE 201 of FIG. 2, and base station 802 refers to base station 102 of FIG. 1 or base station 202-a or 202-b of FIG. 2.

At some point, base station 802 may need to configure and to activate a NC scheme for the transmission of a data flow to the UE 801 (downlink) of from the UE 801 (uplink). This action may be triggered for example by the level of Quality of Service (QoS) associated to the data flow.

According to one embodiment of the invention, if the QoS level corresponds to a high reliability and a low latency requirement (like for URLLC), Network Coding shall be applied as soon as both base station 802 and UE 801 support it.

In another embodiment of the invention, the requirement for NC may be triggered by an information received in a message 803 from UE 801. For instance, UE 801 may report a bad quality of communications (due to fading or interferences), and thus UE 801 may (implicitly or explicitly) request the use of NC. In one embodiment of the invention, the message 803 is the Radio Resource Control (RRC) message MesurementReport described in TS 38.331 (version 16.0.0). Alternatively, it may be the RRC message FailureInformation also described in TS 38.331. At step 804, base station 802 decides to consider the use of NC based on the above elements.

If Data Radio Bearer already exists and satisfies the required QoS level, the data flow is then transmitted over this DRB. Otherwise, a new DRB needs to be established and some verifications are performed by the base station 802 at step 805. First, the base station itself shall support NC. This is verified by reading its internal parameters, which indicate the NC configurations, including NC schemes, that are supported if several configurations are specified.

Also, base station 802 needs to check if the UE 802 supports NC and which NC schemes are supported by the UE. These elements may already be known by the base station, typically from previous message exchanges with the UE to establish the connection, or may be retrieved from the UE 801 with an exchange of messages regarding the UE capability. In addition, base station 802 may check which transmission mode Carrier Aggregation or Dual/Multi-Connectivity is feasible for setting up a Network Coding communication with the UE. The aforementioned elements related to NC support by the UE along with the associated NC schemes may also be checked by reading parameters stored in a memory or through dedicated messages exchanged with the UE.

In case the use of NC is feasible, base station 802 determines the NC configuration at step 806. In one embodiment of the invention, this means that base station 802 selects a NC scheme, a transmission mode for NC (i.e. transmission through CA, or DC . . . ), the number of associated transmission legs (i.e. RLC layers) to be used, the number of linear combinations to produce and the coefficients to be used, as well as the mapping of each linear combination to the selected legs. For instance, DC is the preferred mode (for spatial diversity) with 2 legs (for low complexity), the selected NC scheme is the first in a predefined list of several NC schemes supported by both base station 802 and UE 801, and the number of linear combinations is a function of the requested QoS level and of the current quality of radio links.

In one embodiment of the invention, all or part of the above configuration parameters may be considered. The list of these parameters is non-limitative and other configuration parameters may be considered.

In step 807, the transmission mode (CA, DC . . . ) is set-up according to the previous decisions made in step 804. In one embodiment of the invention, this step may be skipped if the selected transmission mode is already active. In another embodiment of the invention, this step comprises the configuration of the layers of the protocol stack described in FIGS. 5, 6 and 7 according to the relevant 3GPP standards. In case of Multi-connectivity the addition of one or several secondary base stations shall be performed by the base station 802 which may become the master node (as the base station 202-a in FIG. 2). Procedures for the addition of a secondary node are described in the 3GPP document TR 37.340 (section 10.2 in version 16.1.0).

The four steps 804, 805, 806 and 807 define the NC configuration procedure. To simplify the description of other figures, these steps are gathered in a single step referred to as NC configuration procedure 808.

Then, all or part of the NC configuration parameters shall be transmitted to the UE 801 using the NC configuration request message 809. In one embodiment of the invention, the NC configuration request message 809 is transmitted via the Radio Resource Control (RRC) message 809 RRCReconfiguration, defined in TS 38.331 (version 16.0.0) for the RRC protocol in the control plane, and amended for the purpose of this invention with fields relative to the NC configuration added, for example, in one of the information elements carried in the message. It includes a command sent by the base station 802 to the UE 801 to apply NC configuration for the data flow. The NC configuration parameters may comprise, not restrictively, an indication related to the used NC scheme, an indication relative to the coefficients used to generate each linear combination, an indication of the leg used to transmit each combination. This message also carries the information to enable the UE 801 to set-up the transmission mode (CA, DC.) with the number of used legs.

In response to the message 809, the UE 801 acknowledges with the NC configuration complete message 810, which may be, in one embodiment of the invention, the RRC message RRCReconfigurationComplete as defined in TS 38.331.

Then, UE 801 configures its NC encoding engine 1724 (for an uplink transmission) or NC decoding engine 1725 (for a downlink transmission) to be ready to apply the selected NC scheme. In case of uplink transmission, UE 801 can start encoding the packets to transmit according to the selected NC scheme. In case of downlink transmission, the UE 801 will decode the received packets according to the selected NC scheme.

In base station 802, the reception of message 810 indicates the UE is ready to apply NC. At step 812, base station 802 activates NC: in case of a downlink transmission, it can start encoding the packets to transmit, and in case of uplink transmission, it will decode the received packets according to the agreed NC configuration.

At step 811, UE 801 activates NC, i.e. it starts encoding the packets to transmit in case of an uplink transmission, and in case of downlink transmission, it will decode the received packets according to the agreed NC configuration.

Figure 9:
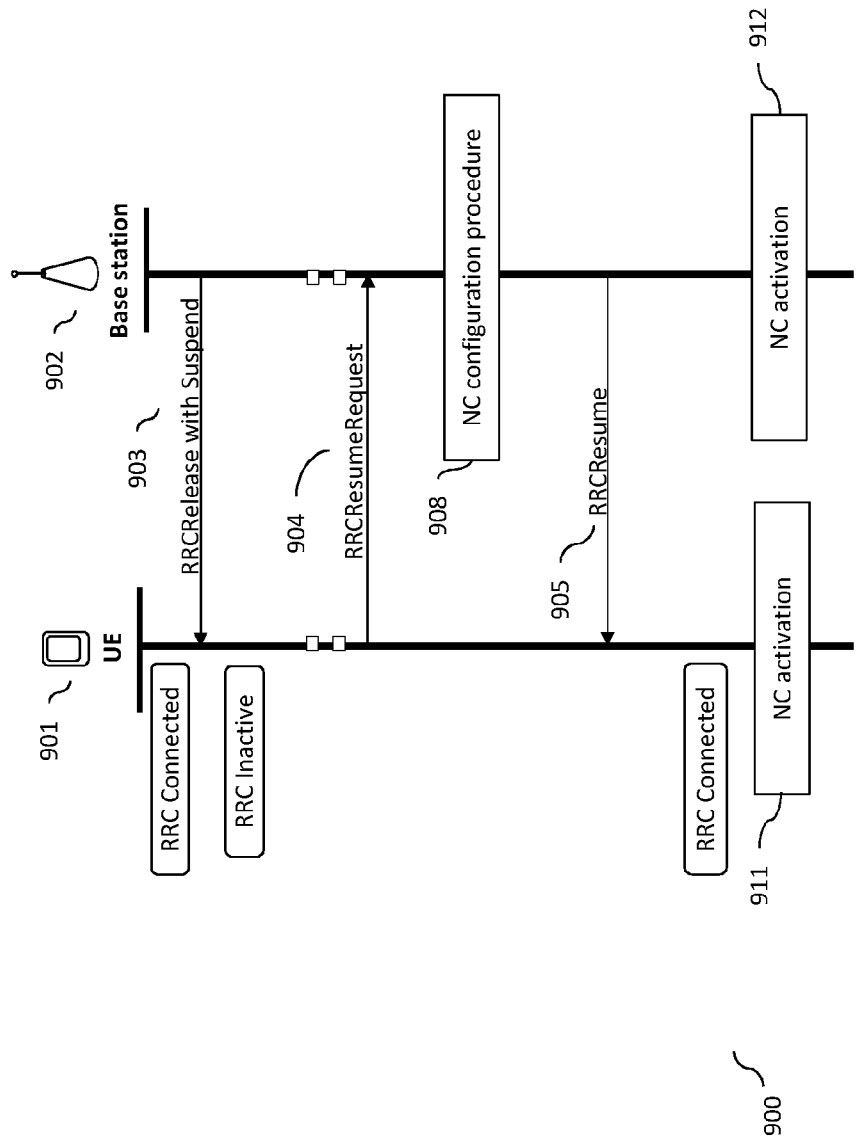
FIG. 9 illustrates an example of process flow that supports the NC configuration and activation process according to another embodiment of the invention.

FIG. 9 illustrates an example of process flow 900 that supports the NC configuration and activation process according to another embodiment of the invention.

It assumes that a UE 901 is in RRC connected state as defined in TS 38.331, meaning that UE 901 is connected to a base station 902, which is a gNB in a 5G NR network in the context of this figure. Signalling radio bearers are established between base station 902 and UE 901. The UE 901 is also registered in the core network entity not represented on the figure.

According to one embodiment of the invention, UE 901 refers to UE 101 of FIG. 1 or UE 201 of FIG. 2, and base station 902 refers to base station 102 of FIG. 1 or base station 202-*a* or 202-*b* of FIG. 2.

After a certain time without activity for the UE 901 (no transmission or reception of data), base station 902 may send to UE 901 the RRC message 903 called RRCRelease, with the suspend configuration as described in TS 38.331. The purpose may be to reduce power consumption in UE 901 and/or to save some radio bandwidth. Upon reception of this message 903, the UE 901 stores the current configuration, which may include a Network Coding configuration that may have been agreed previously, in relation with FIG. 8, and moves to the RRC state called RRC inactive. Base station 902 also stores the current configuration, which may also include a Network Coding configuration that may have been agreed previously, in relation with FIG. 8.

At some point, the base station 902 may have new data to transmit to UE 901, and base station 902 initiates the paging procedure to notify the UE (message not represented on the figure). Alternatively, UE 901 may have new data to transmit and therefore it has to request base station 902 to resume the connection. In both cases, UE 901 sends the RRC message 904 called RRCResumeRequest as defined in TS 38.331.

Upon reception of message 904, the base station 902 will resume the connection. At this occasion, base station 902 may consider activating Network Coding for the communications associated to this communication, and therefore may apply the NC configuration procedure 908, which is identical to NC configuration procedure 808 (see also FIG. 8). Then, base station 902 sends to UE 901 the RRC message 905 called RRCResume and defined in TS 38.331. This message may include a new configuration of the radio bearers. As for the NC configuration request message 809, the RRCReconfiguration information 905 may be amended with the same additional fields relative to the NC configuration.

Upon reception of message 905, the UE 901 returns to the state RRC connected. Also at step 911, UE 901 configures its NC encoding engine (for an uplink transmission) or NC decoding engine (for a downlink transmission) according to the content of the message 905 (new configuration or previous one). When a NC scheme shall be applied for an uplink transmission, UE 901 can start encoding the packets to transmit according to the selected NC configuration. In case of downlink transmission, the UE 901 will decode the received packets according to the selected NC configuration.

At step 912, base station 902 activates NC (if it is required). In case of downlink transmission, it can start encoding the packets to transmit, and in case of downlink transmission, it will decode the received packets according to the selected NC scheme.

At step 911, UE 901 activates NC, i.e. it starts encoding the packets to transmit in case of an uplink transmission, and in case of downlink transmission, it will decode the received packets according to the selected NC configuration.

Figure 10:
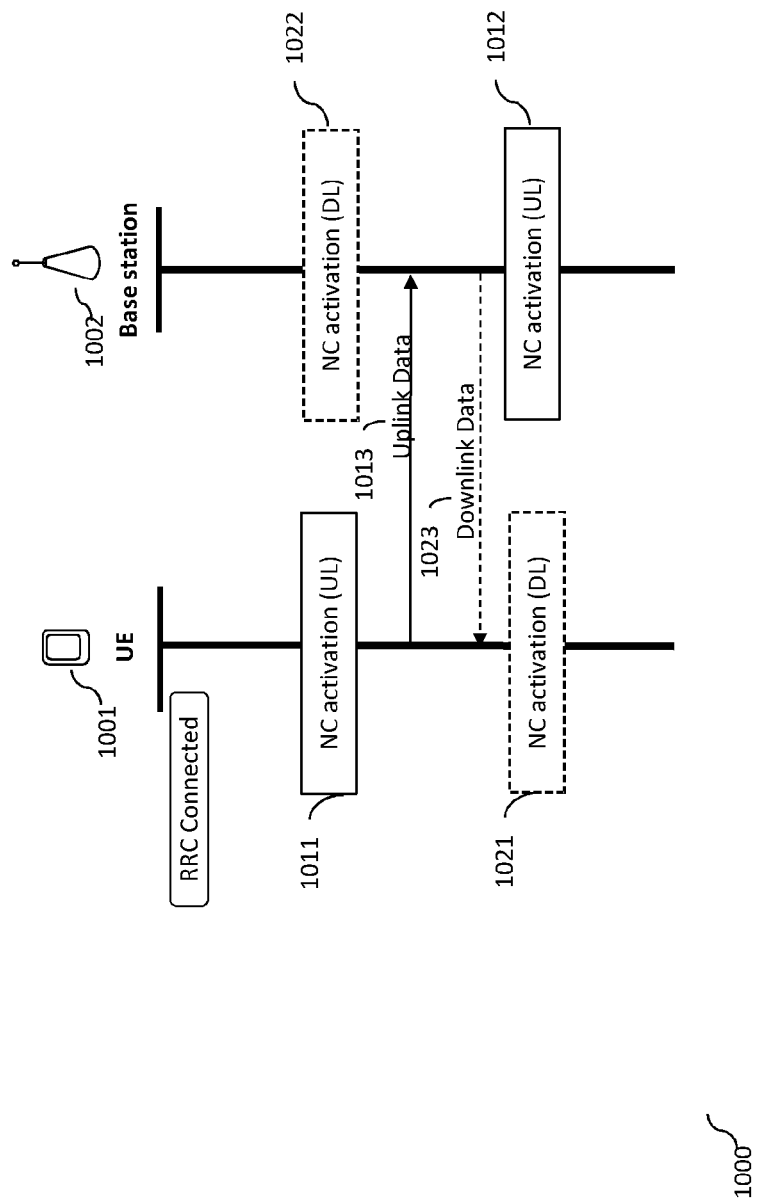
FIG. 10 illustrates an example of process flow that supports the synchronization of NC activation according to one embodiment of the invention.

FIG. 10 illustrates an example of process flow 1000 that supports the synchronization of NC activation according to one embodiment of the invention. The UE 1001 may be the UE 801 entering in step 811 of FIG. 8 for NC activation, or it may be the UE 901 entering in step 911 of FIG. 9 for NC activation. The base station 1002 may be the base station 802 entering in step 812 of FIG. 8 for NC activation, or it may be the base station 902 entering in step 912 of FIG. 9 for NC activation.

Other situations where the synchronization method of FIG. 10 is to be applied may also be considered in other embodiments of the invention, in relation with any of FIGS. 8 to 15.

At the time of NC activation for an existing radio bearer with data flow(s) already being transmitted, the data packets will become NC encoded. The receiver of these packets needs to understand when the packets become NC encoded. Despite the receiver knows that NC will be applied, some packets which are not yet NC encoded may still be received because they were already in the transmission queue of the transmitter at the time of decision to apply network coding. In one embodiment of the invention, to synchronize the start of NC between the emitter and the receiver, an indication on whether NC encoding is applied or not is inserted in the headers of the transmitted packets. In one embodiment of the invention, the indication is inserted in the header handled by the layer performing the NC encoding and the decoding. In one embodiment of the invention, the layer performing the NC encoding and the NC decoding is the PDCP layer, as defined by 3GPP in TS 38.323.

Hence for an uplink transmission, when the UE 1001 activates NC in step 1011, it will start to encode the packets with the NC notification inserted in the headers. The uplink data packets 1013 are transmitted to the base station 1002, which parses the headers of each received packet. When a packet is identified as being NC encoded, the base station 1002 activates the NC decoding engine 1725 in step 1012.

For a downlink transmission, when the base station 1002 activates NC in step 1022, it will start to encode the packets with the NC notification inserted in the headers. The downlink data packets 1023 are transmitted to the UE 1001, which parses the headers. When a packet is identified as being NC encoded, the UE 1001 activates the NC decoding engine 1725 in step 1021.

Figure 11:
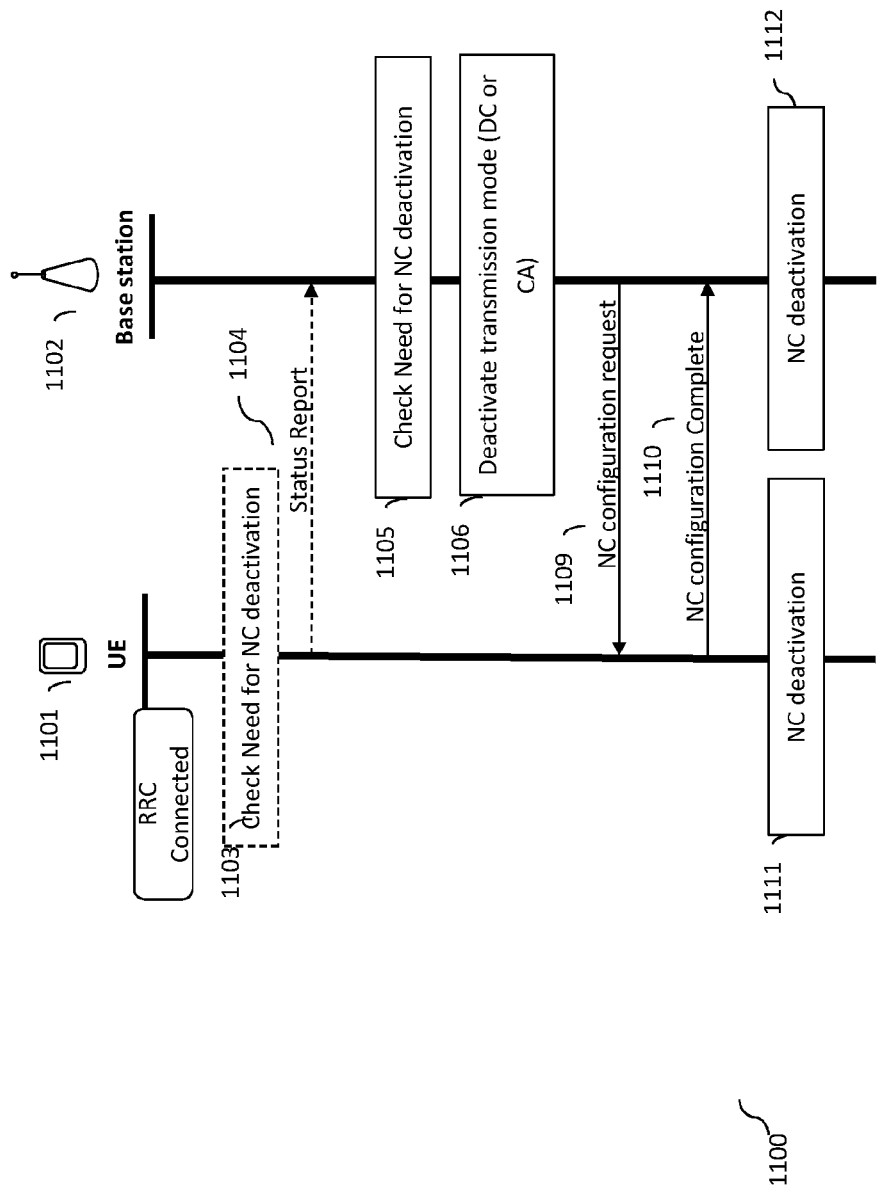
FIG. 11 illustrates an example of process flow that supports NC deactivation process according to one embodiment of the invention.

FIG. 11 illustrates an example of process flow 1100 that supports NC deactivation process according to one embodiment of the invention.

It assumes that a UE 1101 is in RRC connected state as defined in TS 38.331, meaning that UE 1101 is connected to a base station 1102 (which may be a gNB in a 5G NR network). It is also assumed that at least one uplink or downlink Data Radio Bearer (DRB) with an active NC scheme has been established between base station 1102 and UE 1101.

According to one embodiment of the invention, UE 1101 refers to UE 101 of FIG. 1 or UE 201 of FIG. 2, and base station 1102 refers to base station 102 of FIG. 1 or base station 202-*a* or 202-*b* of FIG. 2.

At some point, base station 1102 may consider in step 1105 to deactivate the NC currently in operation for a DRB.

In one embodiment of the invention, this action is triggered by the detection of an improvement of radio link(s) quality with the UE 1101 (for an uplink transmission). In another embodiment of the invention, it may be triggered by an information received in a message status report 1104 from UE 1101. For instance, UE 1101 may report an improvement of the quality of communications with the base station 1102, and thus UE 1101 may (implicitly or explicitly) request the deactivation of NC. In one embodiment of the invention, the status report message 1104 is the Radio Resource Control (RRC) message MeasurementReport described in TS 38.331 (version 16.0.0). In another embodiment of the invention, it may be the RRC message FailureInformation also described in TS 38.331.

Besides, in case of multi-connectivity, the UE 1101 may report a degradation of the radio link quality with the secondary base station through, for instance, the RRC message SCGFailureInformation described in TS 38.331. Then, there is a need to stop the current NC configuration with multi-connectivity and possibly to activate a new one more appropriate to the new situation. Alternatively, the UE 1101 may report its incapacity to continue to process NC because of low battery, high processing load, or high temperature. This situation may be reported through the RRC message called UEAssistanceInformation described in TS 38.331.

To deactivate NC, base station 1102 may execute the step 1106 to deactivate the transmission mode (Carrier Aggregation, Dual/Multi-Connectivity) that will be no longer required when NC ceases to be used. This step consists in reconfiguring the layers described in FIG. 5, 6, or 7.

Then, base station 1102 sends to UE 1101 the NC configuration request message 1109. In one embodiment of the invention, message 1109 is the RRCReconfiguration, defined in TS 38.331, and amended for the purpose of this invention to include a command to deactivate NC.

In another embodiment of the invention, the message 1109 also informs UE 1101 to deactivate the transmission mode (CA, DC . . . ) used for NC.

In response to the message 1109, the UE 1101 acknowledges request message 1109 by sending a NC configuration complete message 1110, which may be, in one embodiment of the invention, the RRC message 1110 RRCReconfigurationComplete as defined in TS 38.331.

Then, in step 1111, UE 1101 configures its NC encoding engine 1724 (for an uplink transmission) or NC decoding engine 1725 (for a downlink transmission) to stop NC operations for the concerned DRB.

In base station 1102, the reception of message 1110 indicates the UE 1101 is stopping NC operation for the concerned DRB. At step 1112, base station 1102 configures its NC encoding engine 1724 or NC decoding engine 1725 accordingly.

Figure 12:
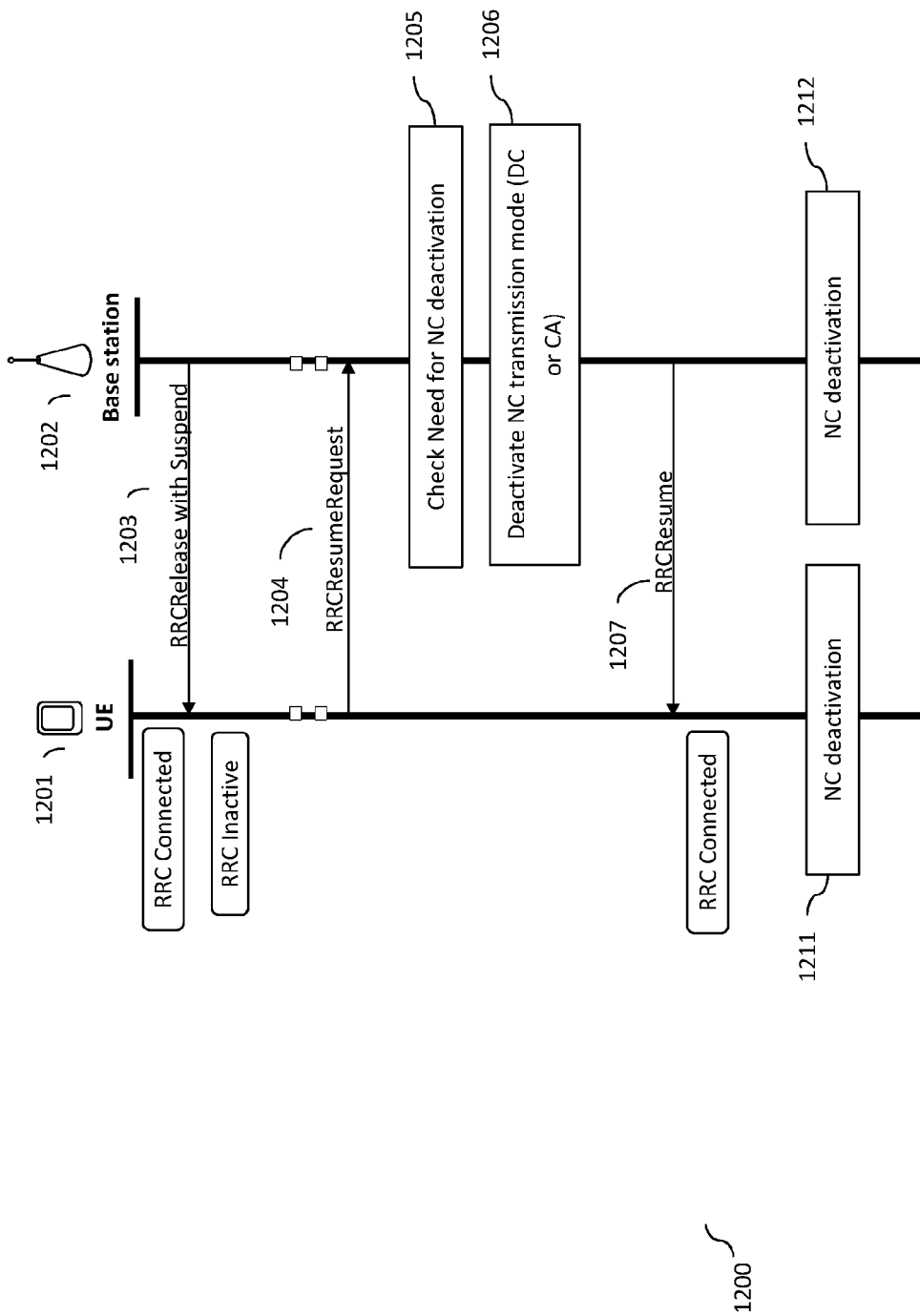
FIG. 12 illustrates an example of process flow that supports NC deactivation process according to another embodiment of the invention.

FIG. 12 illustrates an example of process flow 1200 that supports NC deactivation process according to another embodiment of the invention. It assumes that a UE 1201 is in RRC connected state as defined in TS 38.331, meaning that UE 1201 is connected to a base station 1202 which is a gNB in a 5G NR network in the context of this figure. It is also assumed that at least one uplink or downlink Data Radio Bearer (DRB) with an active NC scheme has been previously established between base station 1202 and UE 1201.

According to one embodiment of the invention, UE 1201 refers to UE 101 of FIG. 1 or UE 201 of FIG. 2, and base station 1202 refers to base station 102 of FIG. 1 or base station 202-*a* or 202-*b* of FIG. 2.

After a certain time period without activity for the UE 1201 (no transmission or reception of data), the base station 1202 may send to UE 1201 the RRC message 1203 called RRCRelease, with the suspend configuration as described in TS 38.331. The purpose may be to reduce power consumption in UE 1201 and/or to save some radio bandwidth. Upon reception of this message 1203, the UE 1201 stores the current configuration and moves to the RRC state called RRC inactive. Base station 1202 also stores the current configuration.

At some point, base station 1202 may have new data to transmit to UE 1201, and base station 1202 initiates the paging procedure to notify the UE (message not represented on the figure). Alternatively, UE 1201 may have new data to transmit and therefore it has to request base station 1202 to resume the connection. In both cases, UE 1201 sends the RRC message 1204 called RRCResumeRequest as defined in TS 38.331.

Upon reception of message 1204, the base station 1202 will resume the connection. At this occasion, base station 1202 may consider deactivating the Network Coding previously applied to the data radio bearer (DRB) for the given data flow. For this purpose, the steps 1205 and 1206 are executed. Step 1205 is identical to step 1105 while step 1206 is identical to step 1106 of FIG. 11.

Then, base station 1202 sends to UE 1201 the RRC message 1207 called RRCResume as defined in TS 38.331. This message may include a new configuration of the radio bearers. Similar to message 1109 RRCReconfiguration in FIG. 11, the RRCResume message 1207 is amended with the same command to deactivate NC.

Upon reception of message 1207, the UE 1201 returns to the state RRC connected. Also at step 1211, UE 1201 configures its NC encoding engine (for an uplink transmission) or NC decoding engine (for a downlink transmission) to stop NC operations for the involved data radio bearer.

At step 1212, base station 1202 configures its NC encoding engine or NC decoding engine accordingly to stop NC operations for the involved DRB.

Figure 13:
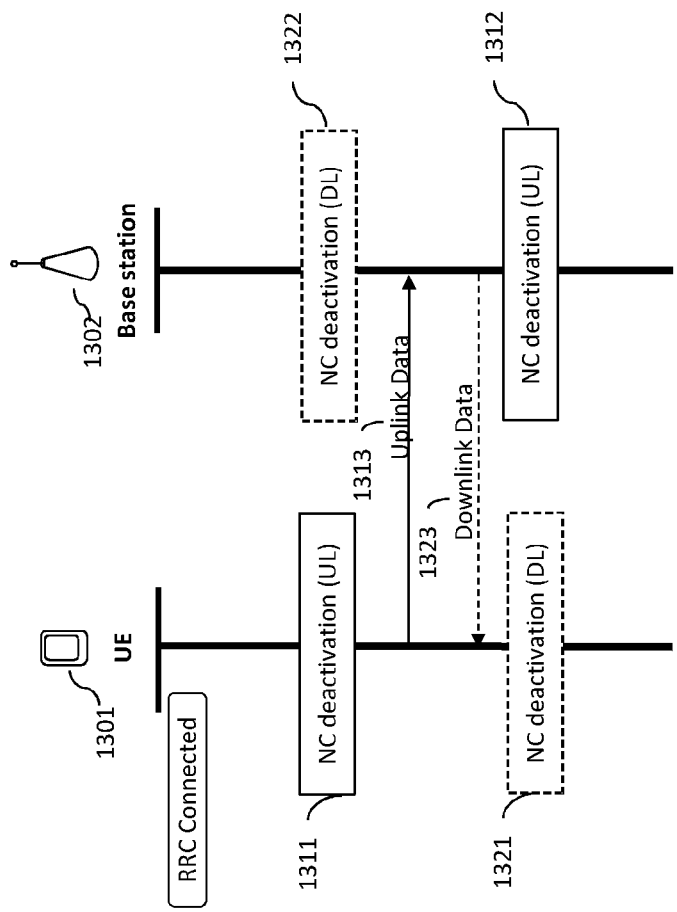
FIG. 13 illustrates an example of process flow that supports the synchronization of NC deactivation according to one embodiment of the invention.

FIG. 13 illustrates an example of process flow 1300 that supports the synchronization of NC deactivation according to one embodiment of the invention. The UE 1301 may be the UE 1101 entering in step 1111 of FIG. 11 for NC deactivation, or it may be the UE 1201 entering in step 1211 of FIG. 12 for NC deactivation. The base station 1302 may be the base station 1102 entering in step 1112 of FIG. 11 for NC deactivation, or it may be the base station 1202 entering in step 1212 of FIG. 12 for NC activation.

Other situations where the synchronization method of FIG. 13 is to be applied may also be considered in other embodiments of the invention, in relation with any of FIGS. 8 to 15.

At the time of NC deactivation for an existing radio bearer with data flow(s) being transmitted, the data packets will no more be NC encoded. The receiver of these packets needs to understand when the packets are no more NC encoded. Despite the receiver knows that NC will be stopped, some packets which are NC encoded may still be received because there were already in the transmission queue of the transmitter at the time of decision to stop network coding. To synchronize the stop of NC between the emitter and the receiver, an indication that NC is applied or not is inserted in the headers of the transmitted packets. Preferably, the indication is inserted in the header handled by the layer performing the NC encoding and the decoding. In one embodiment of the invention, the layer performing the NC encoding and the decoding is the PDCP layer, as defined by 3GPP in TS 38.323.

Hence for an uplink transmission, when the UE 1301 deactivates NC in step 1311, it will stop to encode the packets with the NC deactivation notification inserted in the headers. The uplink data packets 1313 are transmitted to the base station 1302 which parses the headers of each received packet. When a packet is identified as not being NC encoded, the base station 1302 deactivates the NC decoding engine 1725 in step 1312.

For a downlink transmission, when the base station 1302 deactivates NC in step 1322, it will stop to encode the packets with NC deactivation notification inserted in the headers. The downlink data packets 1323 are transmitted to the UE 1301 which parses the headers. When a packet is identified as not being NC encoded, the UE 1301 deactivates the NC decoding engine 1725, described below in relation to FIG. 17, in step 1321.

Figure 14:
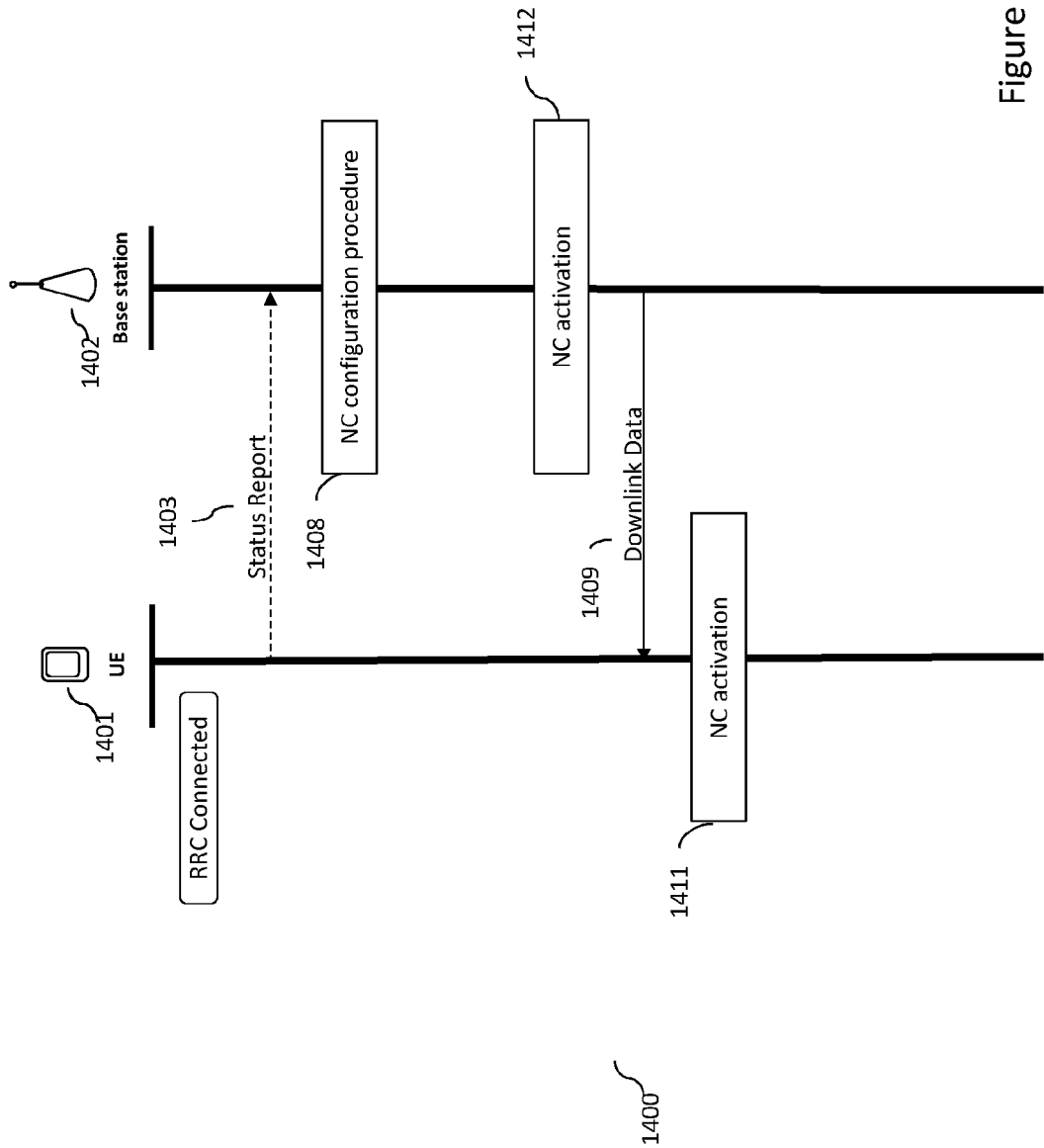
FIG. 14 illustrates an example of process flow that supports the NC configuration and activation process for a downlink transmission according to another embodiment of the invention.

FIG. 14 illustrates an example of process flow 1400 that supports the NC configuration and activation process for a downlink transmission according to another embodiment of the invention.

It assumes that a UE 1401 is in RRC connected state as defined in TS 38.331, meaning that UE 1401 is connected to a base station 1402 (which may be a gNB in a 5G NR network). The UE 1401 is also registered in the core network entity not represented on the figure.

According to one embodiment of the invention, UE 1401 refers to UE 101 of FIG. 1 or UE 201 of FIG. 2, and base station 1402 refers to base station 102 of FIG. 1 or base station 202-a or 202-b of FIG. 2.

At some point, base station 1402 may need to configure and to activate a NC scheme for the downlink transmission of a data flow to the UE 1401. In one embodiment of the invention, this decision may be triggered by the QoS level associated to the data flow, or, in another embodiment of the invention, by the reception of a status report message 1403 from UE 1401. The message 1403 may be the message 803 described in FIG. 8. Then at step 1408, base station 1402 applies the NC configuration procedure already described in FIG. 8 at step 808.

In case Data Radio Bearers need to be configured, for instance if CA or DC transmission mode is deactivated, then base station 1402 sends to UE 1401 a RRC message RRCReconfiguration as defined in TS 38.331. In response to the message this RRCReconfiguration message, the UE 1401 sends to base station 1402 a RRC message RRCReconfigurationComplete as defined in TS 38.331.

Then, the NC configuration (or part of it) shall be transmitted to the UE 1401. This is here achieved by inserting NC configuration parameters in a specific NC header appended to at least one of the network coded packets. It means that the base station 1402 activates the NC function at step 1412 by enabling its NC encoding engine 1724 for the data flow, and at least one of the downlink data packets 1409 transmitted to the UE 1401 will include the NC header. In one embodiment of the invention, the NC header is an extension of the packet header handled by the layer performing the NC encoding and the decoding. In one embodiment of the invention, the layer performing the NC encoding and the NC decoding is the PDCP layer. The legacy header shall be amended to include a notification that the packet is NC encoded and therefore contains a NC header. The NC configuration parameters embedded in the NC header include an indication related to the used NC scheme, an indication relative to the coefficients used to encode the packet. In one embodiment of the invention, all or part of the above configuration parameters may be considered. The list of these parameters is non-limitative and other configuration parameters may be considered.

When receiving downlink data packets 1409, the UE 1401 will parse the headers of each received packet, including the specific NC headers, and thus retrieve the NC configuration and be able to decode the received NC encoded packets. When a NC encoded packet is detected, the UE 1401 configures and activates its NC decoding engine 1725 at step 1411 according to the retrieved NC configuration.

In another embodiment a first part of the Network Coding configuration is transmitted by base station for instance by a RRC message such as RRCReconfiguration message 809 of FIG. 8. And a second part of the configuration is embedded in the NC header appended to at least one of the network coded packets.

Figure 15:
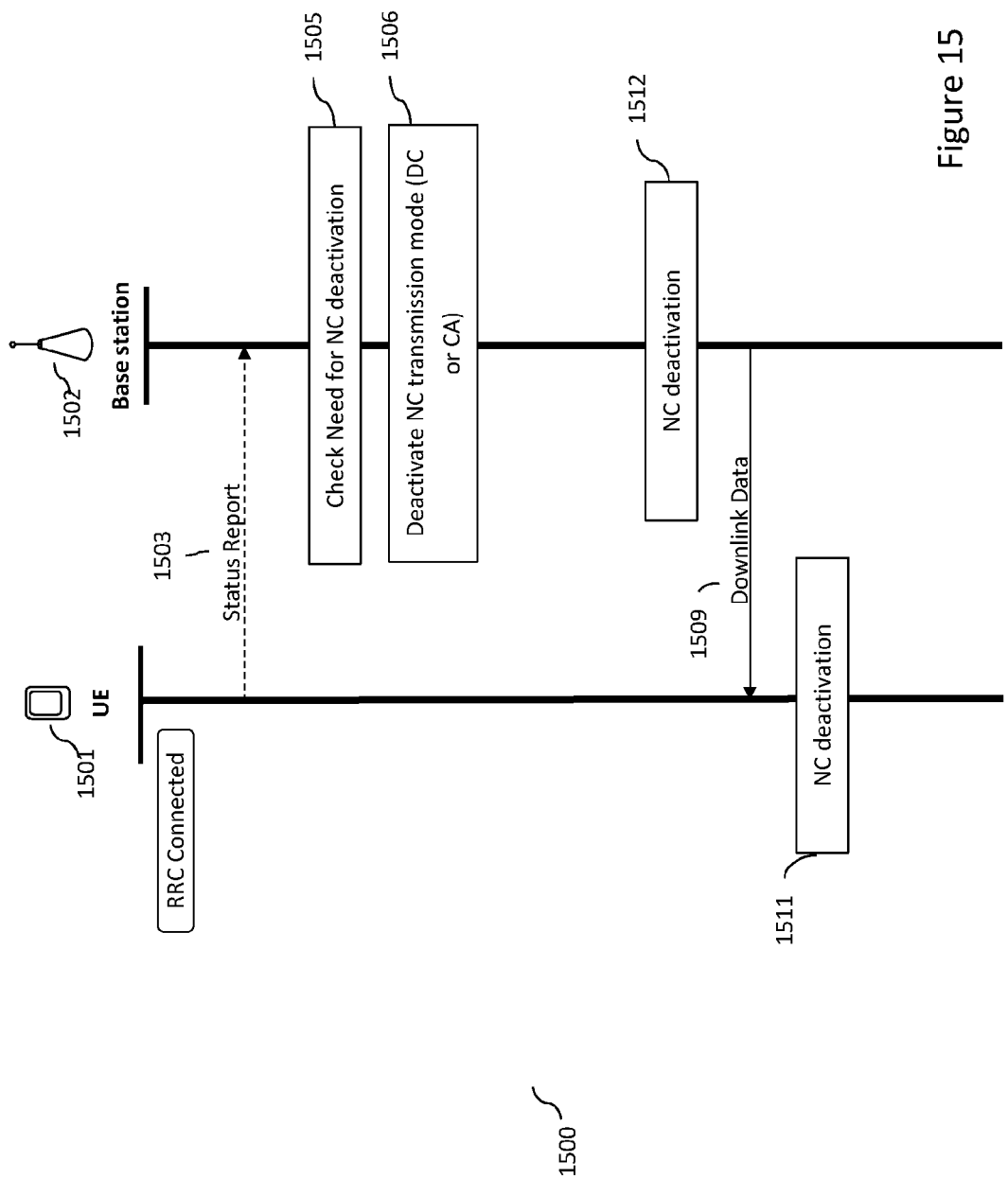
FIG. 15 illustrates an example of process flow that supports NC deactivation process for a downlink transmission according to another embodiment of the invention.

FIG. 15 illustrates an example of process flow 1500 that supports NC deactivation process for a downlink transmission according to another embodiment of the invention.

It assumes that a UE 1501 is in RRC connected state as defined in TS 38.331, meaning that UE 1501 is connected to a base station 1502 (which may be a gNB in a 5G NR network). It is also assumed that at least one downlink Data Radio Bearer (DRB) with an active NC scheme has been established between base station 1502 and UE 1501.

According to one embodiment of the invention, UE 1501 refers to UE 101 of FIG. 1 or UE 201 of FIG. 2, and base station 1502 refers to base station 102 of FIG. 1 or base station 202-a or 202-b of FIG. 2.

At some point, base station 1502 may consider in step 1505 deactivating the NC currently in operation for a DRB. This action may be triggered by the detection of an improvement of radio link(s) quality with the UE 1501, for instance with the information received in a status report message 1503 from UE 1501. For instance, UE 1501 may report an improvement of the quality of communications, and thus UE 1501 may (implicitly or explicitly) request the deactivation of NC. In one embodiment of the invention, the message 1503 is the Radio Resource Control (RRC) message MeasurementReport described in TS 38.331 (version 16.0.0). Besides, in case of multi-connectivity, the UE 1501 may report a degradation of the radio link quality with the secondary base station, through, for instance, the RRC message SCGFailureInformation described in TS 38.331. Then, there is a need to stop the current NC configuration with multi-connectivity (and may be to activate a new one more appropriate to the new situation). Alternatively, the UE 1501 may report its incapacity to continue to process NC because of low battery, high processing load, or high temperature. This situation may be reported through the RRC message called UEAssistanceInformation described in TS 38.331.

Following the decision to deactivate NC, base station 1502 may execute the step 1506 to deactivate the transmission mode (Carrier Aggregation, Dual/Multi-Connectivity) that will be no more required when NC is not used. This step consists in reconfiguring the layers described in FIG. 5, 6, or 7.

In case Data Radio Bearers need to be configured, for instance if CA or DC transmission mode is deactivated, then base station 1502 sends to UE 1501 a RRC message RRCReconfiguration as defined in TS 38.331. In response to the message this RRCReconfiguration message, the UE 1501 sends to base station 1502 a RRC message RRCReconfigurationComplete as defined in TS 38.331.

Then, the command to deactivate NC shall be transmitted to the UE 1501. This is here achieved by inserting a notification in packets headers. Preferably, the notification is added in the packet header handled by the layer performing the encoding and the decoding. In one embodiment of the invention, the layer performing the NC encoding and the NC decoding is the PDCP layer, as defined by 3GPP in TS 38.323. The base station 1502 deactivates the NC function at step 1512 by disabling its NC encoding engine for the data flow. The notification of NC deactivation will be present in the at least one of the packets to be NC encoded and further transmitted.

When receiving downlink data packets 1509, the UE 1501 will parse the header of each received packet to determine if NC is deactivated. In case of such determination, UE 1501 deactivates its NC decoding engine 1725 at step 1511.

Figure 16:
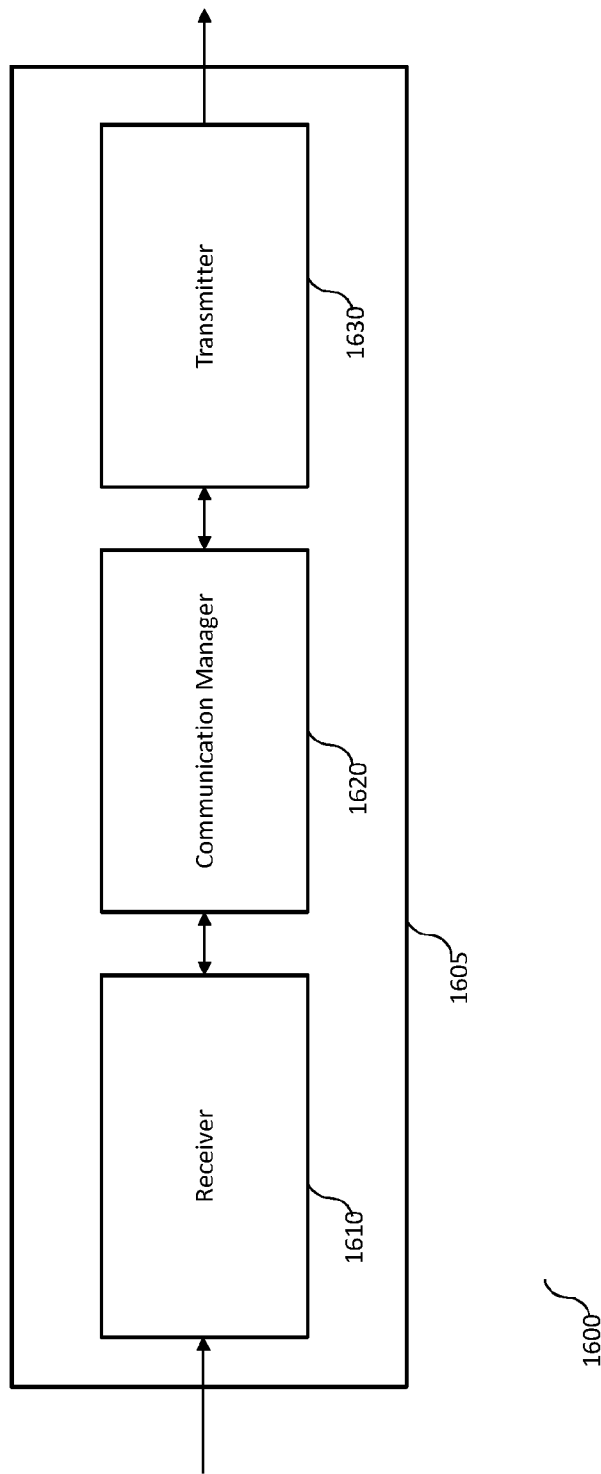
FIG. 16 illustrates a block diagram of a device that supports Network Coding according to the invention.

FIG. 16 illustrates a block diagram 1600 of a device 1605 that supports Network Coding according to the invention. Device 1605 may be an example of UE 101 or of base station 102 in relation with FIG. 1 or UE 201 or base station 202-a or 202b of FIG. 2. Device 1605 comprises a Receiver 1610, a Communication Manager 1620 and a Transmitter 1630. Each of these elements may be in communication with each other through one or more electronic buses.

The receiver 1610 receives both user plane and control plane packets, but may also receive synchronization signals. It may also receive specific signals for connection establishment purpose. Receiver 1610 may receive signals used for measurements or paging purpose.

Figure 18:
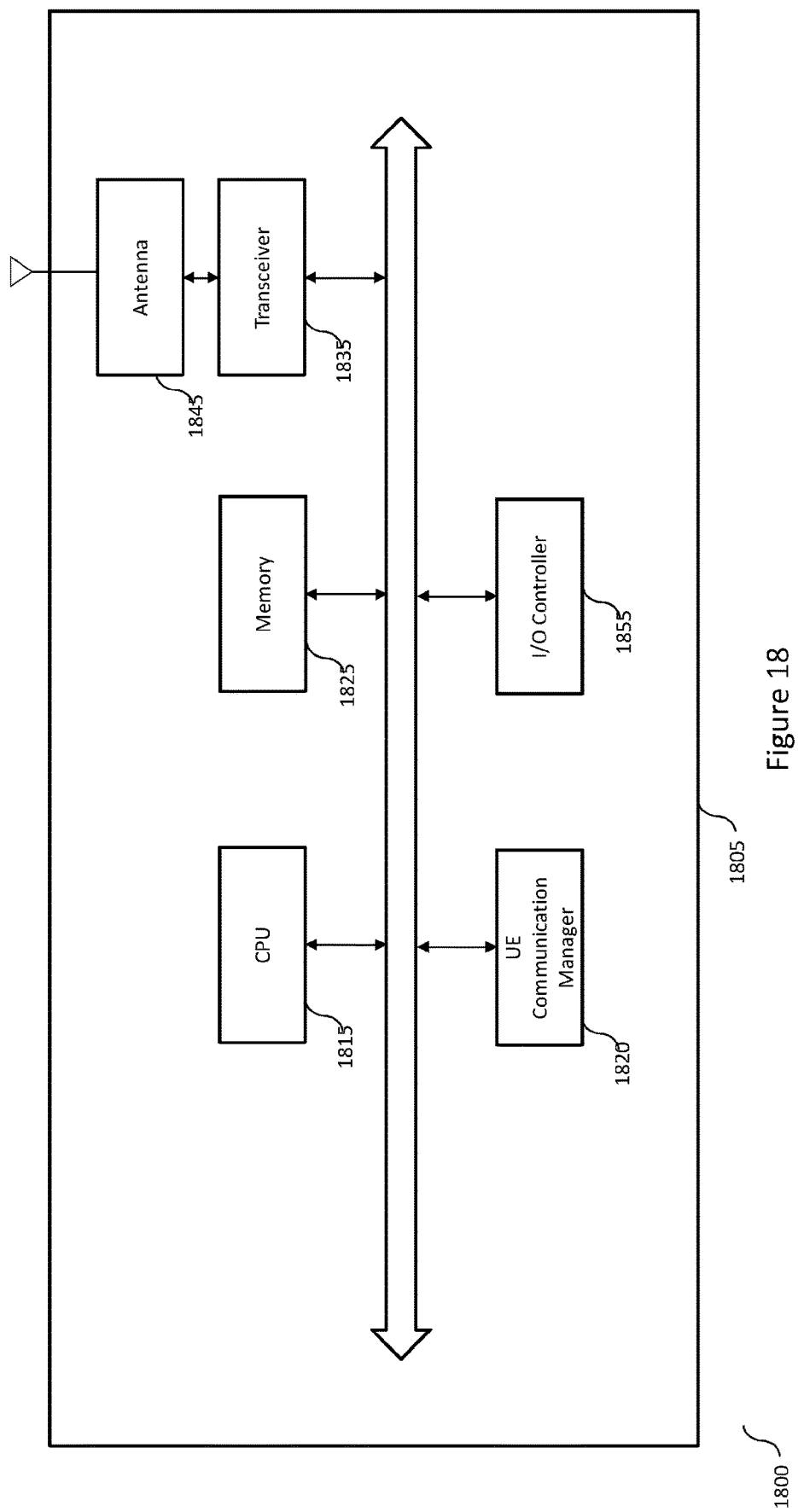
FIG. 18 illustrates a block diagram of a UE that supports Network Coding.
Figure 19:
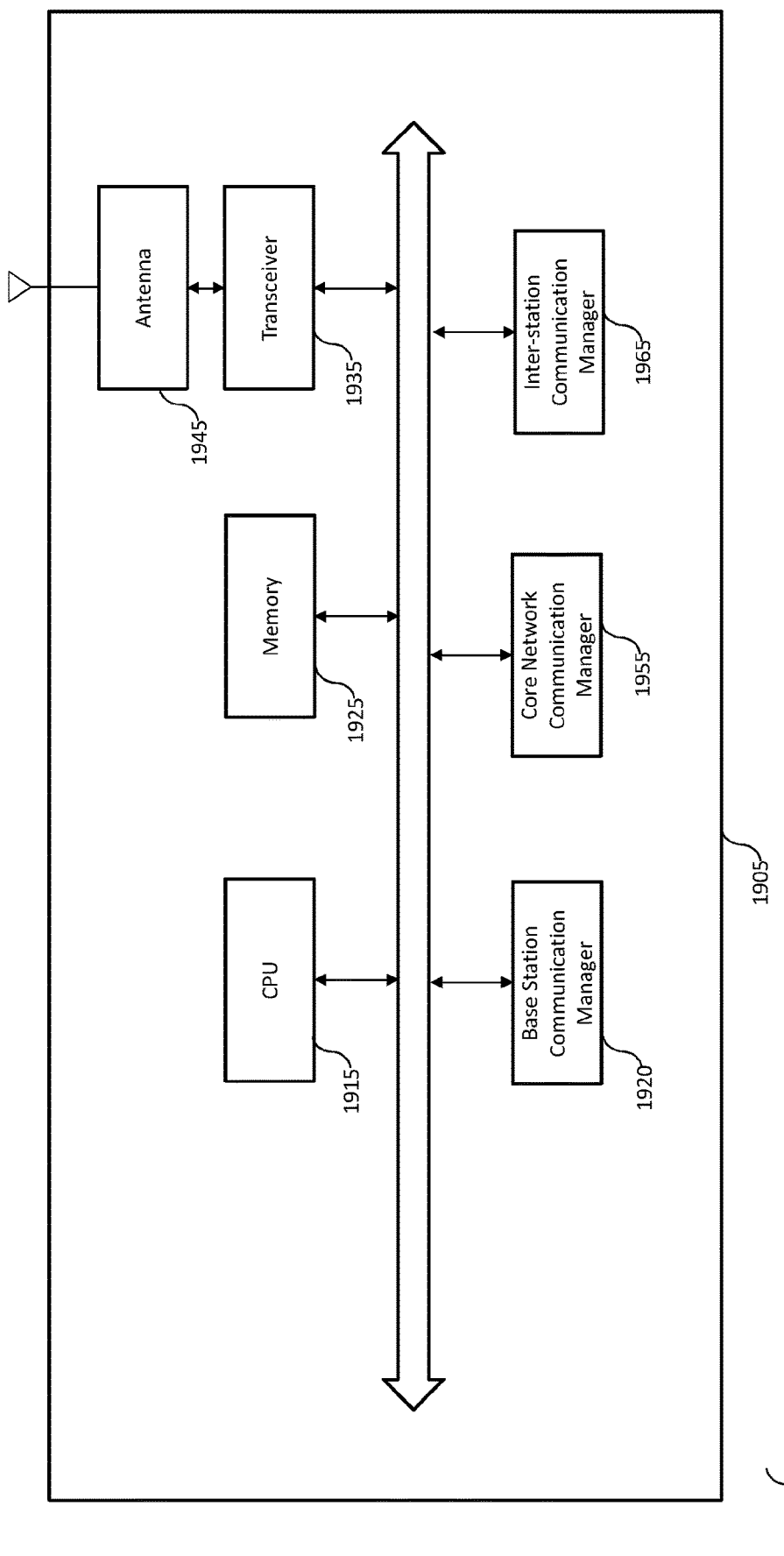
FIG. 19 illustrates a block diagram of a base station that supports Network Coding.

Receiver 1610 may refer to all or part of 1835 as described in FIG. 18 or 1935 as described in FIG. 19.

In one embodiment of the invention, the receiver 1605 may receive packets encoded with a network coding scheme, in relation with FIG. 3 and FIG. 4.

The Communication Manager 1620 is responsible for the establishment, the control and the release of a communication. The functions of Communication Manager 1620 may be distributed and not necessarily resident in a same physical location.

In one embodiment of the invention, the Communication Manager 1620 manages all or part of the Network Coding configuration and activation embodiments, in relation with FIGS. 8 to 15.

The Transmitter 1630 transmits both user plane and control plane packets, as well as synchronization signals, measurement signals, paging signals and signals specific to the initiation of a connection.

The Transmitter 1630 may refer to all or part of 1835 as described in FIG. 18 or 1935 as described in FIG. 19.

In one embodiment of the invention, the Transmitter 1630 may transmit packets encoded with a network coding scheme, in relation with FIG. 3 and FIG. 4.

Hardware, software and firmware can be used to implement the elements of device 1605. Hardware here includes CPUs, FPGAs, Application Specific Integrated Circuits as well as DSPs, GPUs, and discrete elements electronic, either logic or analog, or any combination of these means. When an element is virtualized, i.e. the function is implemented by the execution of a programmatic code, such code may be executed in a single or in parallel threads, upon a CPU, a DSP or a GPU, or even on a remote generic server. Communications between elements can be made by wires, buses or even optical fiber, or by memory buffers if the element is virtualized. The elements may be localized together or distributed in various places, even remote.

Figure 17:
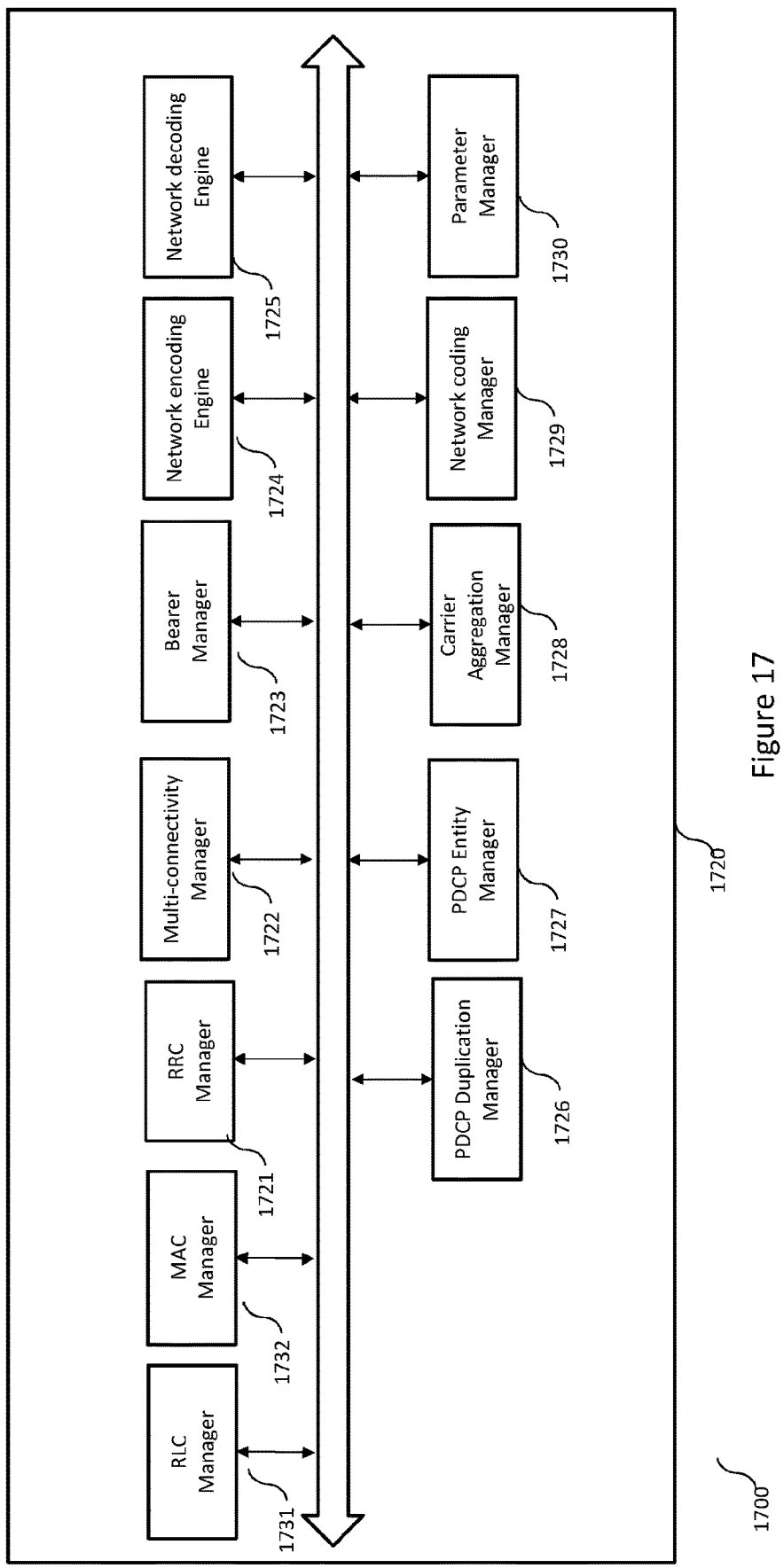
FIG. 17 illustrates a first block diagram of a Communication Manager that supports Network Coding according to the invention.

FIG. 17 illustrates a first block diagram 1700 of a Communication Manager 1720 that supports Network Coding according to embodiments of the invention. It is a non-limitative example of the Communication Manager 1620.

The Communication Manager operates several protocols, common to both ends of a wireless communication.

Communication Manager 1720 includes an RRC Manager 1721, a Multi Connection Manager 1722, a Bearer Manager 1723, a Network Encoding Engine 1724, a Network Decoding Engine 1725, a PDCP Duplication Manager 1726, a PDCP Entity Manager 1727, a Carrier Aggregation Manager 1728, a Network Coding Manager 1729, a Parameter Manager 1730, an RLC Manager 1731, and a MAC Manager 1732. Each of those elements can communicate with each other. The Network Decoding Engine 1725 implements the function described in FIG. 4. Network Encoding Engine 1724 implements the function described in FIG. 3. The Network Coding Manager 1729 is responsible for the set-up and release of Network Decoding Engine 1725 and Network Encoding Engine 1724.

Carrier Aggregation Manager 1728 establishes or releases the use of more than one bandwidth part between the base station and the UE. The Carrier Aggregation Manager has action upon the RLC layers and activates both a principal RLC and a secondary RLC if carrier aggregation is activated. In operation without Network Coding or without PDCP duplication, it behaves like a switch and activates alternatively a first RLC Layer and a second RLC layer.

Multi-Connectivity Manager 1722 establishes or releases the use of more than one bandwidth part between two base stations and the UE. The Multi-Connectivity Manager 1722 has action upon the RLC layers. It activates both a principal RLC and a secondary RLC if multi connection is activated, for user data, or just the principal if multi-connection is not activated.

RRC Manager 1721 handles the RRC protocol Engine. The RRC protocol Engine decodes the received messages following the ASN1 specification. In a UE, the RRC Manager 1721 extracts the parameters of Network Coding received from the base station and passes them to the Parameter Manager 1730, while in a base station, it uses the parameters stored in the Parameter Manager and pilots the RRC Protocol engine so that the latter encodes the parameters following the ASN.1 specification before sending them.

PDCP Duplication Manager 1726 handles and releases the use of more than one RLC for a flow of data. It behaves like a repeater in sending the same packet to the multiple RLC layers when duplication is enabled.

PDCP Entity Manager 1727 in the context of this invention handles the PDCP layer. A packet may or may not need header compression, or ciphering or integrity. The PDCP Entity Manager 1727 enables/disables these features. If Network Coding is enabled, it selects the specific header corresponding to the Network Coding.

Bearer Manager 1723 handles the mapping of data flows to Data Radio Bearers (DRBs). In 5G NR, a DRB corresponds to the use of resources implementing the protocols (PDCP, RLC, MAC) and the PHY layer. A DRB may carry several data flows if they belong to the same class of Quality of Service (QoS). Bearer Manager 1723 may enable the Network Coding operations if the packet belongs to the user data plane and disables the Network Coding operations if the packet belongs to the control plane).

Network Coding Manager 1729 handles the Network encoding Engine 1724 and the Network Decoding Engine 1725. It sets the Network Coding parameters when required. The parameters may be stored into the device, or in the Core Network. Network Coding Manager 1729 enables/disables Network Encoding Engine 1724 and/or Network Decoding Engine 1725, according to the selected transmission scheme.

RLC Manager 1731 handles the RLC layer(s). It may enable more than one RLC Layer if the device is in Carrier Aggregation or in Multi-Connectivity.

MAC Manager 1732 handles the MAC Layer(s). It may enable more than one MAC Layer if the device is in Multi-Connectivity and the device is a UE.

FIG. 18 illustrates a block diagram 1800 of a UE system 1805 that supports Network Coding according to one embodiment of the invention. The device includes components for transmitting and receiving communications, including a UE Communication Manager 1820, a I/O controller 1855, a Transceiver 1835, one or more antennas 1845, Memory 1825, and a Processor 1815. All these elements may communicate with each other.

Memory 1825 includes RAM, ROM, or combination of both or as a non-limitative example a mass storage device such as a disk or a Solid-State Drive. Basic Input Output System (BIOS) Instructions may be stored within the Memory.

The processor 1845 is configured to execute machine readable instructions. Execution of these machine-readable instructions causes the device to perform various functions. These functions may be related to transmission (and in particular to Network Coding), or to interaction with peripheral devices like for instance a keyboard, a screen, a mouse, etc. The processor may run an operating system like for instance, iOS, windows, Android, etc.

The I/O Controller 1855 allows these interactions with external peripherals by providing the hardware required and by managing input and output signals.

The transceiver 1835 communicates bi-directionally in wireless with other wireless devices. It provides the necessary modems and frequency shifters necessary to connect to Wi-Fi, Bluetooth, LTE, 5G NR, etc.

The communications go through sets of one or many antennas adapted to the spectrum of the frequency transposed signals, issued from the baseband modems. Each antenna set may be limited to one antenna, but preferably it contains several antennas, in order to provide beam forming capability.

UE Communication Manager 1820 handles the communication establishment of the UE to a Radio Access Network, its control and its release. In one embodiment of the invention, UE Communication Manager 1820 refers to a communication manager 1620 or 1720.

The UE receives from the base station an indication of slots available for its transmission. It then knows where in time and frequency it expects incoming data or must send its outgoing data, whether they belong to the control or data plane. In particular, it may receive, from the base station, the Network Coding parameters to apply for a downlink or an uplink transmission. In one embodiment of the invention, this is achieved according to process flows of FIGS. 8 to 15.

FIG. 19 illustrates a block diagram 1900 of a base station 1905 that supports Network Coding in an embodiment of the invention. The device includes components for transmitting and receiving communications, including a base station Communication Manager 1920, a Core Network Communication Manager 1955, a Transceiver 1935, one or many antennas 1945, Memory 1925, a Processor 1915, and an Inter Station Communication Manager 1965. All these elements may communicate with each other.

The base station Communication Manager 1920 handles the communications with a plurality of UEs. It is responsible for the establishment, the control and the release of these communications. The base station Communication Manager 1920 includes a scheduler. The scheduler allocates time-frequency slots to the different UE communications. An information regarding the schedule of occupation of these slots is sent to all active UEs. In one embodiment of the invention, the base station Communication Manager 1920 refers to a communication manager 1620 or 1720.

The Core Network Communication Manager 1955 manages communications of the base station with the core network.

The Transceiver 1935 communicates bi-directionally in wireless with other wireless devices. These devices may be UEs, or even other base stations. The transceiver provides the necessary modems and frequency shifters in order to connect to a large number of UEs simultaneously, using different frequency carriers, in Time Division Duplex (TDD) or in Frequency Division Duplex (FDD). The transceiver may provide MIMO coding. The transceiver is connected to antennas.

The antenna set may be limited to one antenna, but preferably it contains several antennas, in order to provide beam forming capability.

Memory 1925 includes RAM, ROM, or combination of both or as a non-limitative example a mass storage device such as a disk or a Solid-State Drive. BIOS Instructions may be stored within the Memory to support an operating system.

The processor 1915 executes computer readable instructions performing various functions, for instance the functions related to the Network Coding.

The interstation communication manager 1965 manages communications with other base stations. The interstation communication manager may provide a standardized Xn interface, as defined by 3GPP standards, to support these communications.

Figure 20:
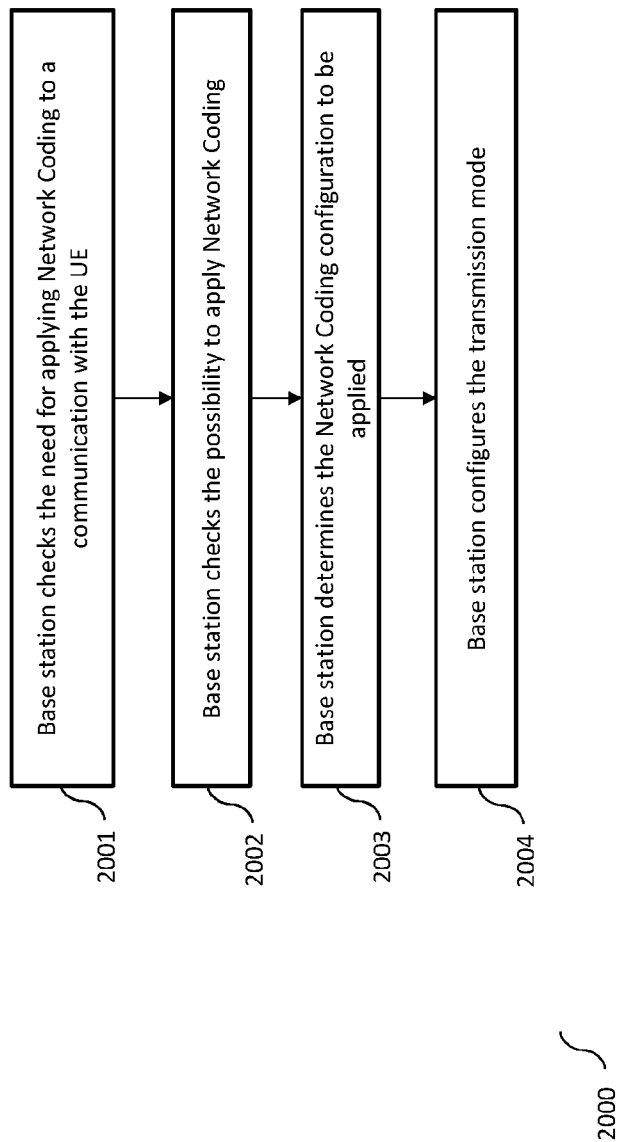
FIG. 20 illustrates a flowchart illustrating a method that supports NC configuration determination and setup process, at a base station level.

FIG. 20 illustrates a flowchart 2000 illustrating a method that supports NC configuration determination and setup process, at a base station level in an embodiment of the invention. The method supports Network Coding configuration of a UE and a base station, on the base station side, in relation with FIGS. 8, 9, and 14. The operation within this method may be implemented by a base station 1900, for instance, in the Communication Manager 1920 of FIG. 19.

The UE is assumed to be in connected mode, and UE is exchanging Control and User Data with the base station, in relation with Figure with FIGS. 8, 9, and 14.

As a background process, the base station follows up the evolution of the network system.

At step 2001 the base station detects the need for applying Network Coding on its connection with the UE. According to some embodiments of the invention this need may result from a degradation in the quality of transmission, due to the UE environment or to new interferences coming from connections of new UEs, or a new flow of data necessitating an Ultra Reliable Low Latency Communication. These are of course non-limitative examples and the one skilled in the art may consider several other causes for applying Network Coding. The need may arise for any bearer (uplink and downlink) that may be established between the base station and the UE.

At step 2002 the base station determines the feasibility of a Network Coding Scheme. This feasibility depends on base station capabilities and the UE capabilities that the base station has previously requested, using the parameter manager 1730 to retrieve the Network Coding capabilities.

The base station also checks for its own load and the queue of the scheduler managing the air media resource, in the MAC layer managed by the MAC manager 1732.

At step 2003, the base station determines the Network Coding configuration. To realize this, the Network Coding Manager 1729 analyses the capabilities for uplink and/or downlink communications, including, but not restricted to, the number of legs possible to handle, the processing capability of the base station and/or the UE, the transmission modes supported by the base station and/or the UE . . . .

In one embodiment of the invention, Network Coding Manager 1729 may also select a specific Network Coding scheme, like as an example the one described in FIGS. 3 and 4, but it may also select, as another example, a Network Code based on Raptor Codes, depending on the kind of traffic the bearer is carrying. The base station (or the communication Manager 1620) sets the Network Coding encoding and/or decoding engines 1724 and 1725 accordingly.

At step 2004 the base station determines the transmission configuration. A Dual connectivity mode or a Carrier Aggregation mode may be used to support the Network Coding scheme, more exactly to define the legs that will be used to carry the encoded packets, offering space or time diversity on top of the coding diversity as proposed in the example of FIGS. 3 and 4. The Carrier Aggregation and the Dual Connectivity are described in TS 38.300 release 16.

The Multi Connection managers 1722 and the Carrier Aggregation Manager 1728 handle these configurations. Note that configuration does not necessarily mean activation of the Network Coding process. And the Network Coding process may also be activated even if the Multi-connectivity or Carrier Aggregation are not configured.

At the end of this method, the base station is ready to send a message containing the information necessary to set up one or several RLC, one PDCP, one or several MAC layers of the UE and to configure its own layers through their managers 1721, 1731, 1732.

Figure 21:
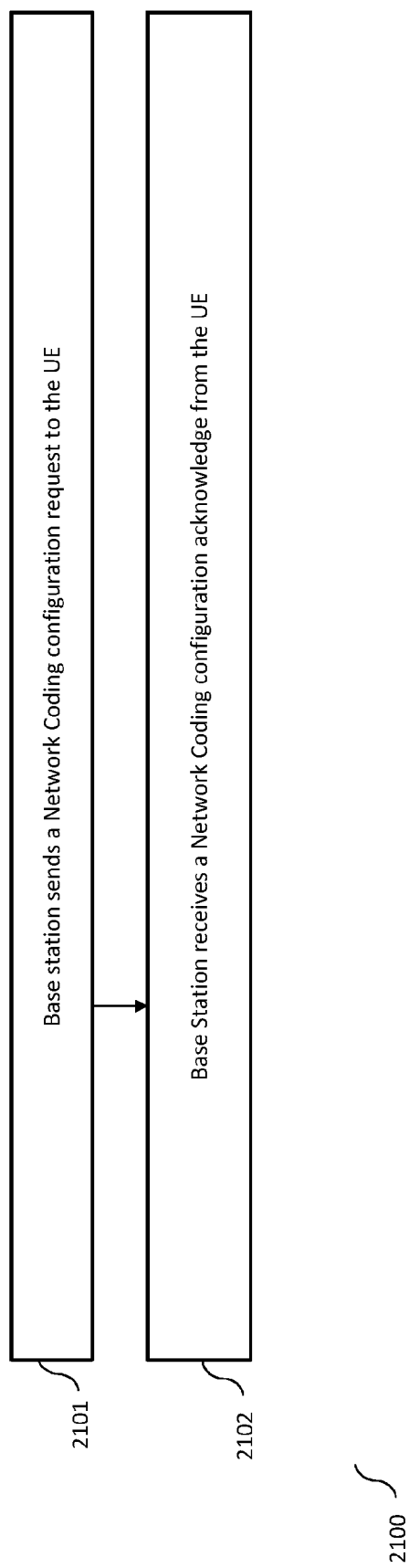
FIG. 21 illustrates a flowchart illustrating a method that supports NC configuration sharing with a UE, at a base station level.

FIG. 21 illustrates a flowchart 2100 illustrating a method that supports NC configuration sharing with a UE, at a base station level in relation with FIGS. 8, 11, 14 and 15. The operation within this method may be implemented by a base station 1900, for instance, in the Communication Manager 1920 of FIG. 19.

As a background process the base station checks for the queue of messages to be sent on the control plane, and on the queue of messages received on the control plane.

At step 2101, having prepared a message using method 2000, the base station sends to the UE involved in the establishment of the Network Coding Process a NC configuration request message. In one embodiment of the invention, the message is the RRCReconfiguration message as described in TS38.331, enhanced to support the Network Coding as previously discussed in this document.

Then at step 2102, the base station, or the communication manager 1920, receives a Network Coding configuration complete from the UE. In one embodiment of the invention, the message is the RRCReconfigurationComplete message as described in TS38.331.

It may happen that the UE Network Coding configuration complete message is not received, or not recovered at base station. In one embodiment of the invention, both the UE and the base station are supposed to operate according to TS 38.331, which indicates the procedure to be applied when information have not been recovered.

Figure 22:
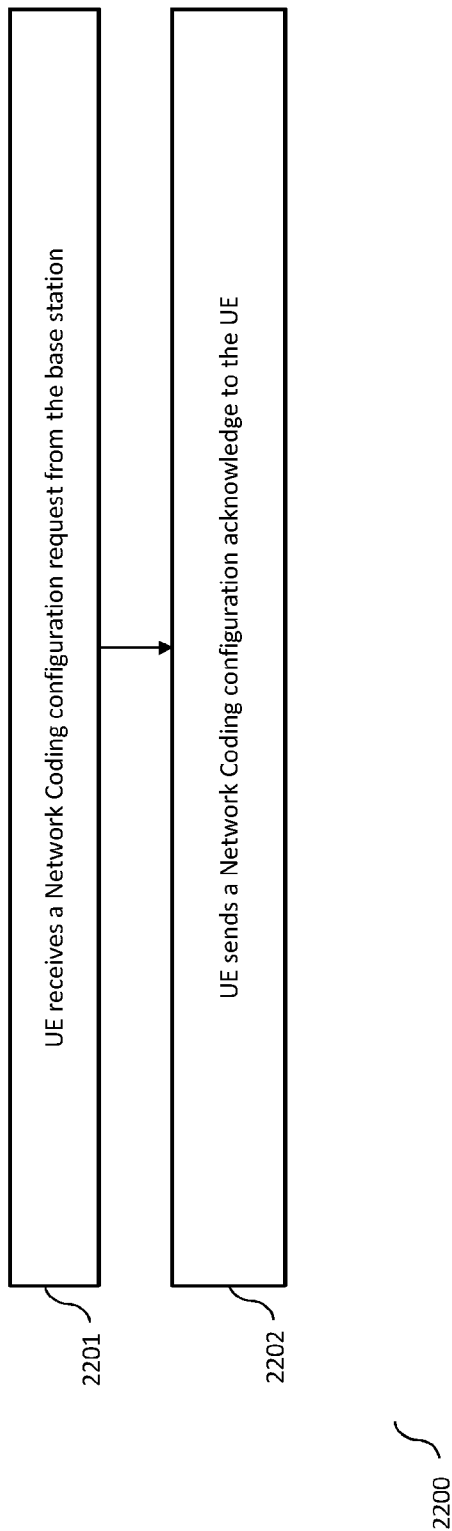
FIG. 22 illustrates a flowchart illustrating a method that supports NC configuration setup by a UE according to one embodiment of the invention.

FIG. 22 illustrates a flowchart 2200 illustrating a method that supports NC configuration setup by a UE according to one embodiment of the invention in relation with FIGS. 8, and 11. The operation within this method may be implemented by a UE 1800, for instance, in the Communication Manager 1820 of FIG. 18.

As a background process the UE checks for the queue of messages to be sent on the control plane, and on the queue of message received on the control plane.

At step 2201, the UE receives a Network Coding configuration request. The message may be, for example, the RRCReconfiguration message as described in TS38.331, amended to support the Network Coding as previously discussed in this document.

As an action implied by this message, the UE sets its protocol stack layers, uplink and/or downlink, according to the NC configuration carried by the message.

Note that the configuration does not necessarily imply immediate activation or deactivation of the Network Coding process.

Then at step 2202, the UE, or the communication manager 1820, sends a Network Coding configuration complete message to the base station. In one embodiment of the invention, the message is the RRCReconfigurationComplete message as described in TS38.331.

Figure 23:
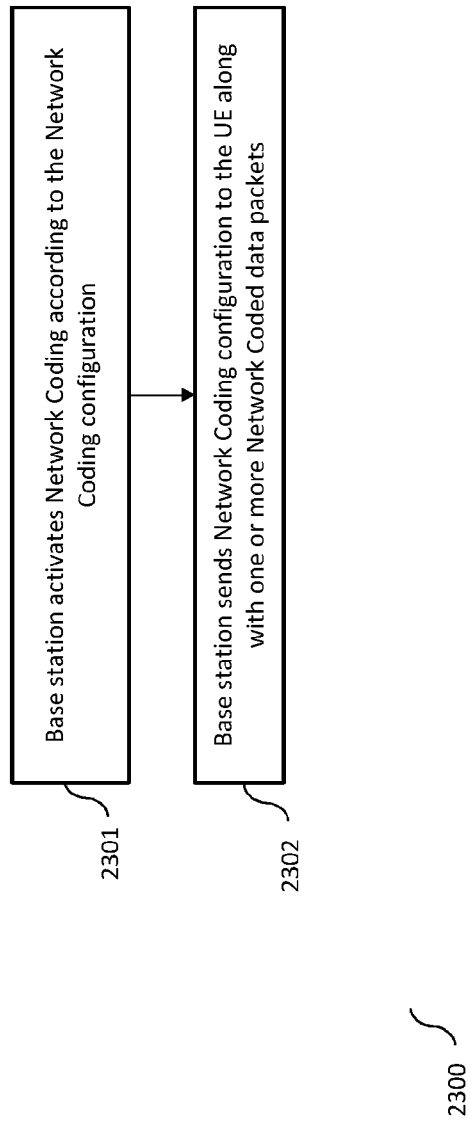
FIG. 23 illustrates a flowchart illustrating a method that supports Network Coding activation by a base station according to one embodiment of the invention.

FIG. 23 illustrates a flowchart 2300 illustrating a method that supports Network Coding activation by a base station according to one embodiment of the invention in relation with FIG. 14. The operations of this method may be implemented by a base station 1900, for instance, in the Communication Manager 1920 of FIG. 19.

At step 2301, the base station activates the Network Coding scheme on its side, according to the predetermined Network Coding configuration established. In one embodiment of the invention, the base station has already configured its protocol layers and now it activates the NC configuration to be applied by both the base station and the UE. Since Network Coding code is applied, changes happen in the packets carried by the bearer. In one embodiment of the invention, a dedicated NC header, which, in another embodiment of the invention, is part of the PDCP header, carries all or part of the Network Coding configuration. In one embodiment of the invention, a dedicated NC header, which, in another embodiment of the invention, is part of the RLC header, carries all or part of the Network Coding configuration. In one embodiment of the invention, a dedicated NC header, which, in another embodiment of the invention, is part of the MAC header, carries all or part of the Network Coding configuration.

At step 2302, the base station sends a data packet embedding NC configuration information according to the processing performed at step 2301.

Figure 24:
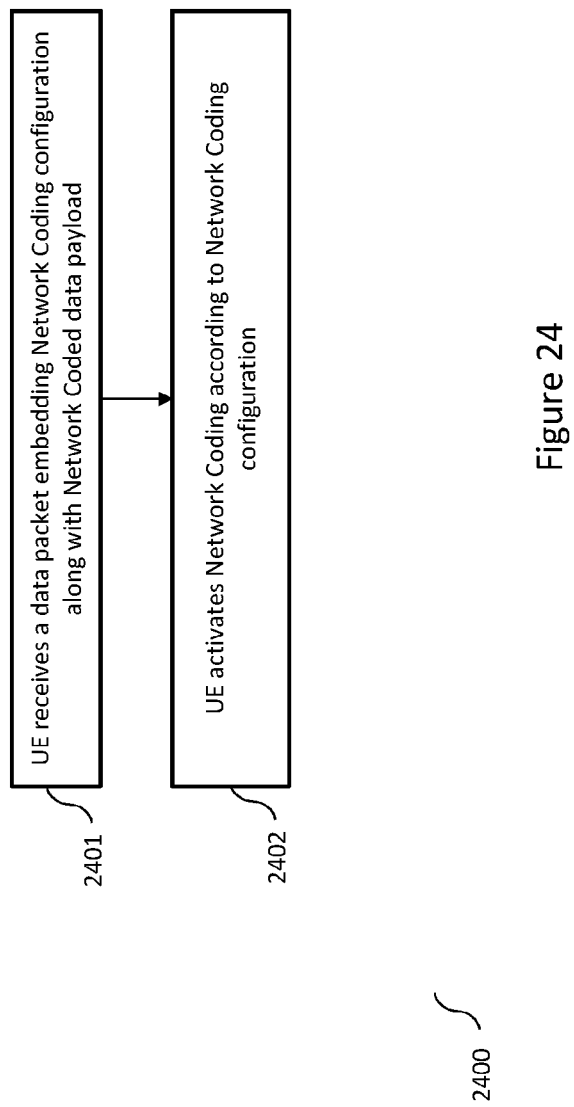
FIG. 24 illustrates a flowchart illustrating a method that supports NC configuration determination, setup and activation process, at a base station level according to one embodiment of the invention.

FIG. 24 illustrates a flowchart 2400 illustrating a method that supports NC configuration determination, setup and activation process, at a UE level according to one embodiment of the invention in relation with FIG. 14. The operations of this method may be implemented by UE 1800, for instance, in the Communication Manager 1820 of FIG. 18.

At step 2401, the UE retrieves the Network Coding configuration present in a data packet formatted according to the method described in FIG. 23. As said in FIG. 23 description, the transmitted data packet embeds payload data and Network Coding configuration, and an indication that the data flow packet is Network Coded.

At step 2402, the UE activates the Network Coding using the configuration retrieved at step 2402.

Figure 25:
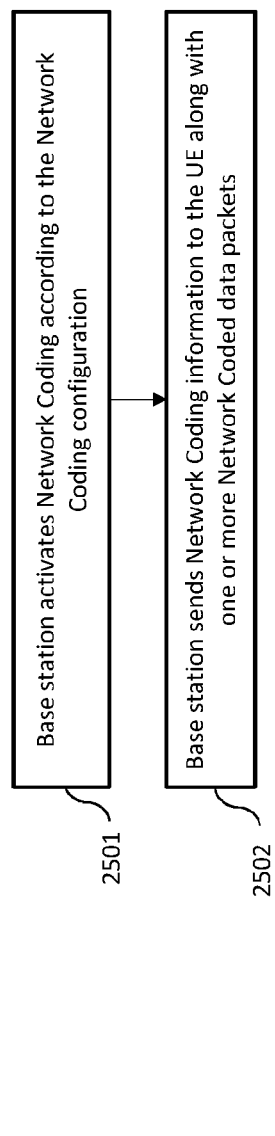
FIG. 25 illustrates a flowchart illustrating a method that supports Network Coding activation by a base station according to one embodiment of the invention.

FIG. 25 illustrates a flowchart 2500 illustrating a method that supports Network Coding activation by a base station according to one embodiment of the invention in relation with FIG. 10. The operations of this method may be implemented by a base station 1900, for instance, in the Communication Manager 1920 of FIG. 19.

At step 2501, the base station activates the Network Coding scheme on its side, according to a predetermined Network Coding configuration established. In one embodiment of the invention, the base station has previously configured its protocol layers and now it activates the associated NC scheme. Since Network Coding code is applied, changes happen in the packets carried by the bearer. In one embodiment of the invention, an information is added to one or more of NC encoded packets that indicates that NC encoding is applied to the packet. The information may indicate that NC encoding will be applied further on a subsequent packet.

In one embodiment of the invention, the information indicates when the NC encoding is applied to the data packet. This may include an identifier of the first data packet to be NC encoded (in case of a NC activation) or not to be NC encoded (in case of a NC deactivation). In one embodiment of the invention, the aforementioned identifier is a sequence number (SN) associated to the data packet.

In one embodiment of the invention, the PDCP header of the packet is amended to embed the aforementioned information.

In one embodiment of the invention, the RLC header of the packet is amended to embed the aforementioned information.

In one embodiment of the invention, the MAC header of the packet is amended to embed the aforementioned information.

At step 2502, the base station sends a data packet formatted according to the processing of step 2501 to the UE.

Figure 26:
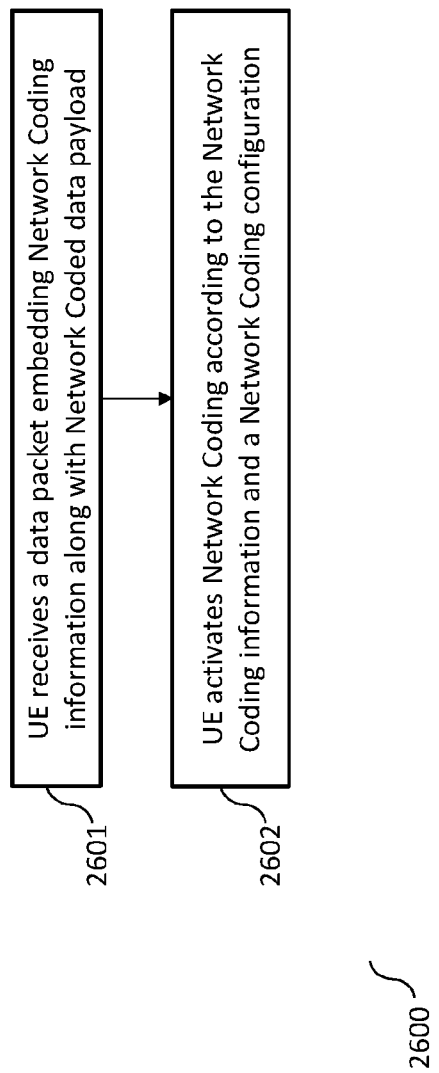
FIG. 26 illustrates a flowchart illustrating a method that supports NC configuration setup by a UE according to another embodiment of the invention.

FIG. 26 illustrates a flowchart 2600 illustrating a method that supports NC configuration setup by a UE according to another embodiment of the invention in relation with FIG. 10.

It assumes that a Network Coding configuration has been formerly received by the UE. In one aspect of the invention, the configuration was received from the Base Station, through an RRC message for instance. In another aspect of the invention, the Network Coding configuration is predetermined and known by both the UE and the Base Station.

The operations of this method may be implemented by a UE 1800, for instance, in the Communication Manager 1820 of FIG. 18.

At step 2601, the UE retrieves the Network Coding information present in a data packet formatted according to the method described in FIG. 25. As said in FIG. 25 description, the transmitted data packet embeds payload data and Network Coding Information, indicating that the data packet is NC encoded.

At step 2602, the UE activates the NC decoding using the configuration retrieved earlier.

Figure 27:
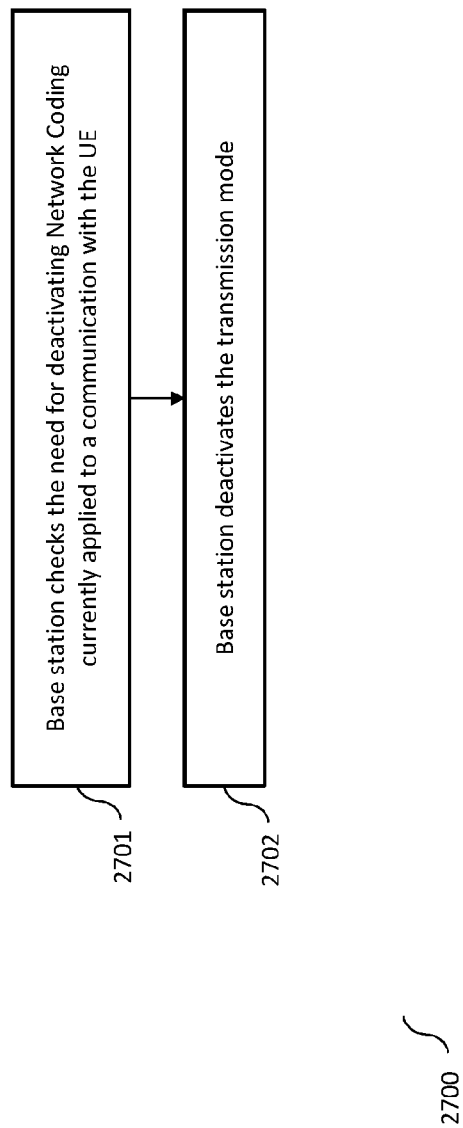
FIG. 27 illustrates a flowchart illustrating a method that supports Network Coding deactivation by a base station according to one embodiment of the invention.

FIG. 27 illustrates a flowchart 2700 illustrating a method that supports Network Coding deactivation by a base station according to one embodiment of the invention in relation with FIGS. 11, 12 and 15. The operations of this method may be implemented by a base station 1900, for instance, in the Communication Manager 1920 of FIG. 19.

As a background process, the base station follows up the evolution of the network system.

At step 2701 the base station detects the need for disabling Network Coding on its connection with the UE. According to some embodiments of the invention this need may result from an improvement in the quality of transmission, due to a change in the UE environment or to interferences disappearing with disconnections of UEs, or the release of a flow of data necessitating an Ultra Reliable Low Latency Communication. These are of course non-limitative examples and the one skilled in the art may consider several other causes for disabling Network Coding. The need may arise for any bearer (uplink and downlink) that may be established between the base station and the UE.

At step 2702, the base station turns off the Network Coding operation. Then only the principal carrier is kept for the transmission bearer.

Figure 28:
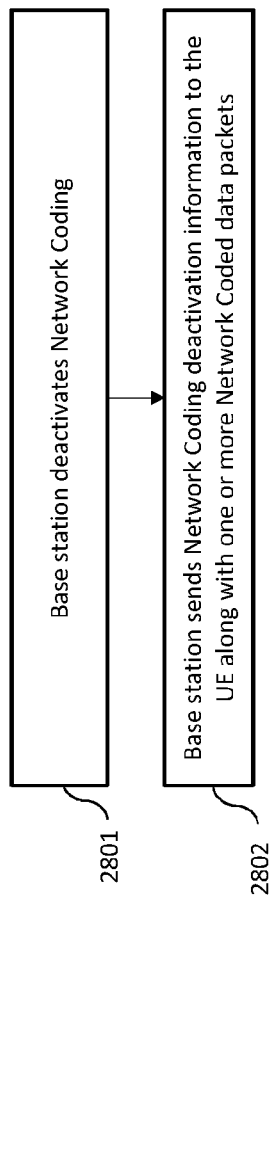
FIG. 28 illustrates a flowchart illustrating a method that supports Network Coding deactivation by a base station according to another embodiment of the invention.

FIG. 28 illustrates a flowchart 2800 illustrating a method that supports Network Coding deactivation by a base station according to another embodiment of the invention in relation with FIG. 13. The operations of this method may be implemented by a base station 1900, for instance, in the Communication Manager 1920 of FIG. 19.

As a background process, the base station follows up the evolution of the network system.

At step 2801 the base station turns off the Network Coding operation.

In another embodiment of the invention, the base station embeds a Network Coding deactivation information inside one or more Network Coded data packets that indicates that NC encoding is or will be stopped.

In one embodiment of the invention, the PDCP header of the packet is amended to embed the aforementioned deactivation information. In other embodiments of the invention, RLC header or MAC header may be amended to embed the aforementioned deactivation information.

At step 2802, the base station sends a data packet formatted according to the processing of step 2801 to the UE.

Figure 29:
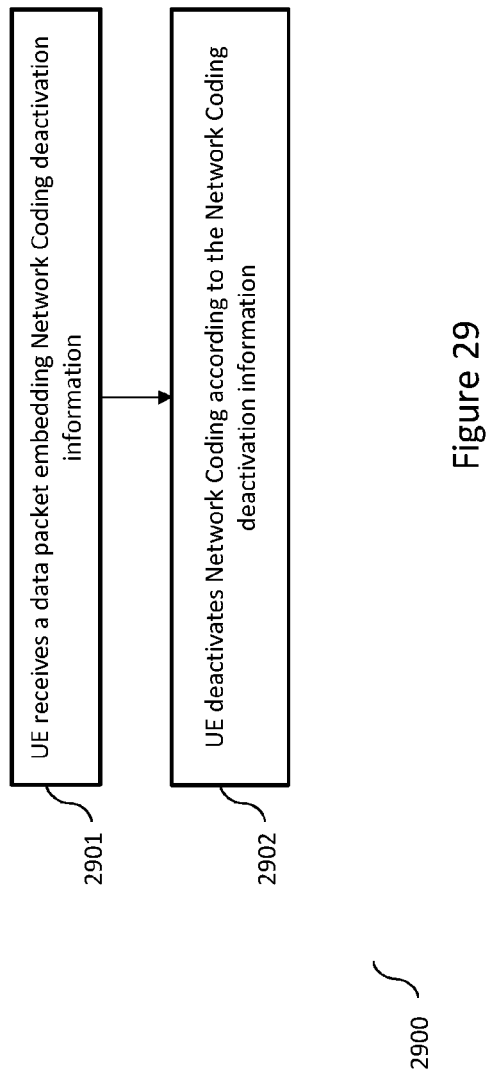
FIG. 29 illustrates a flowchart illustrating a method that supports Network Coding deactivation by a UE according to one embodiment of the invention.

FIG. 29 illustrates a flowchart 2900 illustrating a method that supports Network Coding deactivation by a UE according to one embodiment of the invention in relation with FIG. 13. The operations of this method may be implemented by a UE 1800, for instance, in the Communication Manager 1820 of FIG. 18.

At step 2901, the UE retrieves the Network Coding information present in a data packet formatted according to the method described in FIG. 28. As said in the description of FIG. 28, one or more transmitted data packets embed payload data along with Network Coding Information, indicating that the data flow packet is no longer NC encoded.

At step 2902, the UE deactivates the NC decoding using the configuration retrieved earlier in step 2901.

Figure 30:
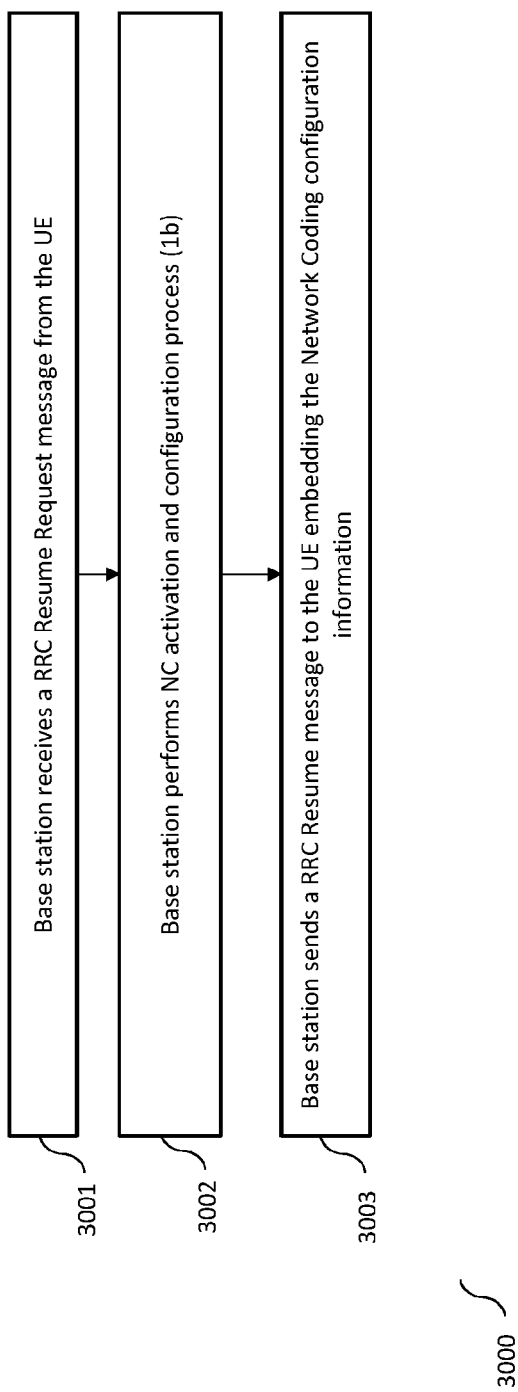
FIG. 30 illustrates a flowchart illustrating a method that supports NC configuration determination, setup and activation process, at a base station level according to one embodiment of the invention.

FIG. 30 illustrates a flowchart 3000 illustrating a method that supports NC configuration determination, setup and activation process, at a base station level according to one embodiment of the invention in relation with FIG. 9. The operations of this method may be implemented by a base station 1900, for instance, in the Communication Manager 1920 of FIG. 19.

The FIG. 9 is somewhat specific to the functioning of the 5G system, that implements means to reduce UE power consumption, in particular the possibility of installing the UE in an Inactive mode where the UE is solicited every 80 milliseconds for a short period of time, instead of every milliseconds. The UE is assumed to be in RRC Inactive mode.

At step 3001 the base station receives an RRC Resume Request coming from the UE, which notifies UE's need to reenter into connected mode with the base station.

At step 3002 the base station goes through the steps 2001 to 2004 as described in flow chart 2000 (FIG. 20).

At step 3003 the base station sends a message to the UE resulting from the operation of Step 3002. This message contains an information related to Network Coding configuration. In one embodiment of the invention, the message is the RRCReconfiguration message as described in TS38.331, amended to support the Network Coding configuration information, as previously discussed in the present document.

Figure 31:
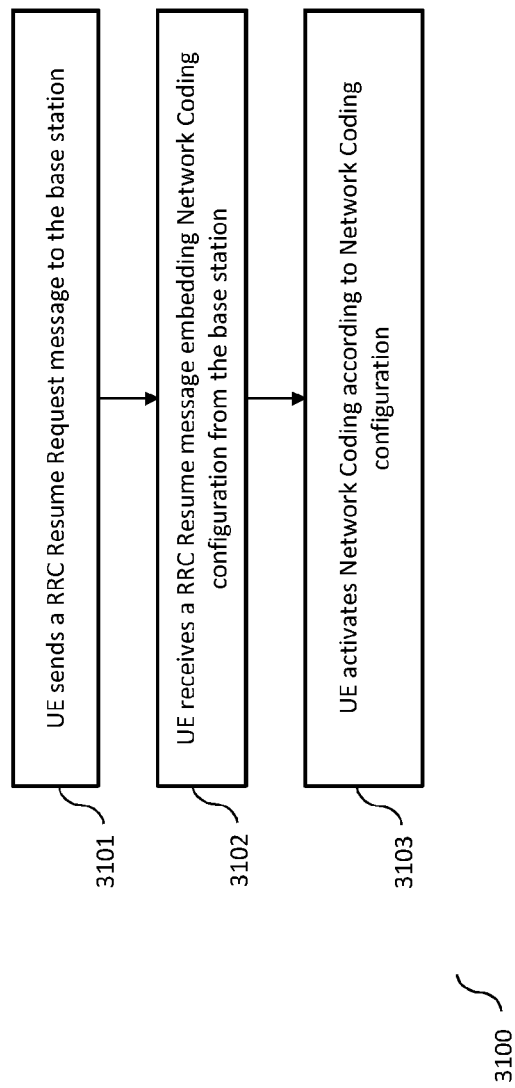
FIG. 31 illustrates a flowchart illustrating a method that supports NC configuration setup by a UE according to another embodiment of the invention.

FIG. 31 illustrates a flowchart 3100 illustrating a method that supports NC configuration setup by a UE according to another embodiment of the invention in relation with FIG. 9. The operations of this method may be implemented by a UE 1800, for instance, in the Communication Manager 1820 of FIG. 18. The UE is assumed to be in RRC Inactive mode.

As some applications on the UE need access to the network, or possibly because the UE was paged, the UE needs to get out of the Inactive mode to a connected mode.

At step 3101, the UE sends an RRC Resume Request message to the base station.

At step 3102, the UE receives an RRC Resume command from the base station. This message may include the necessary configuration parameters to set up a Network Coding scheme. In one embodiment of the invention, the message is the RRCResume message as described in TS38.331, amended to support the Network Coding, as previously discussed in the present document. In other words, the UE disregards its previous configuration, whether Network Coding was activated or not, and applies the received configuration.

At step 3103, the UE configures its protocol stack and activates its Network Coding according to the Network Coding configuration received in step 3102.

Figure 32:
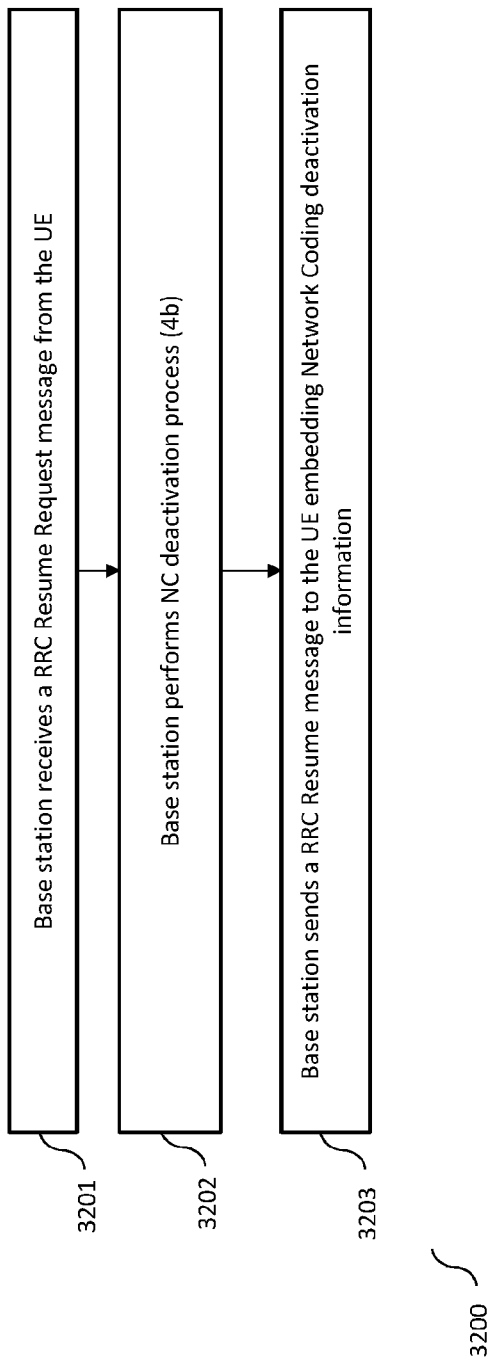
FIG. 32 illustrates a flowchart illustrating a method that supports Network Coding deactivation by a base station according to another embodiment of the invention.

FIG. 32 illustrates a flowchart 3200 illustrating a method that supports Network Coding deactivation by a base station according to another embodiment of the invention in relation with FIG. 12. The operations of this method may be implemented by a base station 1900, for instance, in the Communication Manager 1920 of FIG. 19. The UE is assumed to be in RRC Inactive mode.

At step 3201 the base station receives an RRC Resume Request coming from the UE, and indicating this last needs to reenter into connected mode with the base station.

At step 3202 the base station performs the operations described in flow chart 2700.

As a result, it deactivates the Network Coding operation, even if it was activated before the UE has gone into RRC Inactive mode.

At step 3003 the base station sends a message to the UE resulting from the operation of Step 3002. This message contains the configuration for Network Coding. The message may be per example the RRCResume message as described in TS38.331, enhanced to support the Network Coding. The message here carries a deactivation information.

Figure 33:
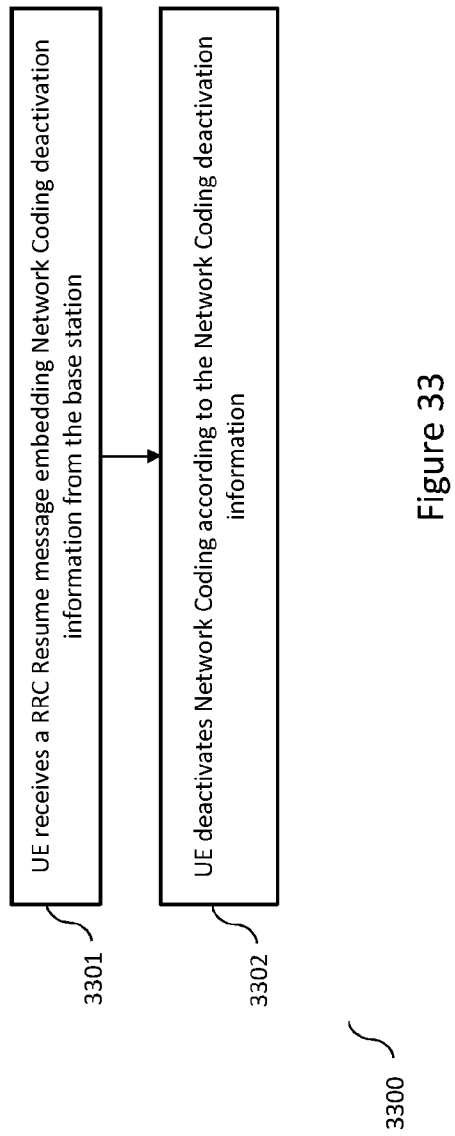
FIG. 33 illustrates a flowchart illustrating a method that supports Network Coding deactivation by a UE according to another embodiment of the invention.

FIG. 33 illustrates a flowchart 3300 illustrating a method that supports Network Coding deactivation by a UE according to another embodiment of the invention in relation with FIG. 12. The operations of this method may be implemented by a UE 1600, for instance, in the Communication Manager 1620 of FIG. 16.

The UE is assumed to be in RRC Inactive mode.

As some applications on the UE need access to the network, or possibly because the UE was paged, the UE needs to get out of the Inactive mode to a connected mode.

At step 3301, the UE sends an RRC Resume Request message to the base station.

At step 3302, the UE receives an RRC Resume command from the base station. This message may include the necessary parameters to set up a Network Coding mode. The message may be per example the RRCResume message as described in TS38.331, enhanced to support the Network Coding. In other words, the UE disregards its previous configuration, whether Network Coding was activated or not, and applies the received configuration.

At step 3303, the UE configures its protocol stacks to comply with the Network Coding configuration, and according to a parameter of the message, may deactivate Network Coding.

Figure 34:
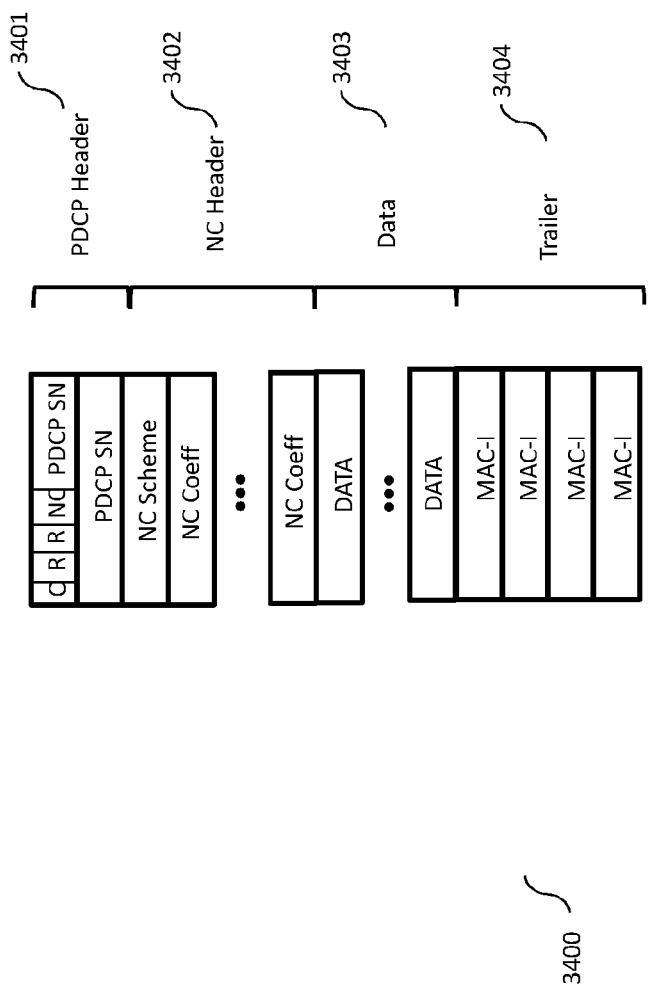
FIG. 34 illustrates an example of packet format at the interface between by the PDCP layer and the RLC layer according to the invention.

FIG. 34 illustrates an example of packet format 3400 at the interface between the PDCP layer and the RLC layer according to an embodiment of the invention. It reuses the PDCP format as defined in the specification TS38.323, issued by the 3GPP organization.

The first section 3401 is the PDCP header composed of:
  One bit indicating if the information embedded in the data section 3403 is user data or control data,
  PDCP Sequence Number (SN),
  Some reserved (R) bits,
  NC activation bit, one additional bit (compared to the standardized header) to indicate if the packet is network coded or not.

The second part 3402 is the NC header added in the context of FIG. 14 when packet contains user data and when the NC activation bit is set to, for example, '1'. NC header includes the indication relative to the used NC scheme, and the list of NC coefficients used to encode the packet. The number of coefficients (i.e. the number of combined parts in the packet) may be indicated by the NC scheme. Alternatively, instead of the list of coefficients, a code may be transmitted identifying a set of predefined coefficients already known by the receiver.

The third section 3403 contains the data.

The fourth section 3404 is the packet trailer which embeds the hash information necessary for the verification of the data integrity.

Following is an illustration of NC configuration information, in relation with messages 809 of FIG. 8, and 905 of FIG. 9. The NC activation and configuration information (in bold below) may be added in the information element called PDCP-Config and itself carried in the parent information element RadioBearerConfig. This RadioBearerConfig information element is carried in the RRC messages RRCReconfiguration and RRCResume. As defined in TS 38.331 (version 16.0.0).

```
RadioBearerConfig ::=            SEQUENCE {
    srb-ToAddModList                 SRB-ToAddMod-              OPTIONAL,
List
    srb3-ToRelease                   ENUMERATED{true}           OPTIONAL,
    drb-ToAddModList                 DRB-ToAddModList           OPTIONAL,
    drb-ToReleaseList                DRB-ToReleaseList          OPTIONAL,
    securityConfig                   SecurityConfig             OPTIONAL,
    ...
}
```

```
DRB-ToAddModList ::=            SEQUENCE (SIZE (1..maxDRB) ) OF DRB-ToAddMod
DRB-ToAddMod ::=                SEQUENCE {
    cnAssociation                   CHOICE {
        eps-BearerIdentity              INTEGER (0..15),
        sdap-Config                     SDAP-Config
                                                                            OPTIONAL,
    }
    drb-Identity                    DRB-Identity,
    reestablishPDCP                 ENUMERATED{true}                        OPTIONAL,
    recoverPDCP                     ENUMERATED{true}                        OPTIONAL,
    pdcp-Config                     PDCP-Config                             OPTIONAL,
    ...,
    [[
    dapsConfig-r16                  ENUMERATED{true}                        OPTIONAL
    ]]
}
        PDCP-Config ::=     SEQUENCE {
            drb                     SEQUENCE {
                discardTimer            ENUMERATED {ms10, ms20, ms30, ms40, ms50,
                                        ms60, ms75, ms100, ms150, ms200,
                                        ms250, ms300, ms500, ms750, ms1500,
                                        infinity}                           OPTIONAL,
                pdcp-SN-SizeUL          ENUMERATED {len12bits, len18bits}   OPTIONAL,
                pdcp-SN-SizeDL          ENUMERATED {len12bits, len18bits}   OPTIONAL,
                headerCompression       CHOICE {
                    notUsed                 NULL,
                    rohc                    SEQUENCE {
                        maxCID                  INTEGER(1..16383)           DEFAULT 15,
                        profiles                SEQUENCE {
                            profile0x0001           BOOLEAN,
                            profile0x0002           BOOLEAN,
                            profile0x0003           BOOLEAN,
                            profile0x0004           BOOLEAN,
                            profile0x0006           BOOLEAN,
                            profile0x0101           BOOLEAN,
                            profile0x0102           BOOLEAN,
                            profile0x0103           BOOLEAN,
                            profile0x0104           BOOLEAN
                        },
                        drb-ContinueROHC        ENUMERATED { true }         OPTIONAL
                    },
                    uplinkOnlyROHC          SEQUENCE {
                        maxCID                  INTEGER (1..16383)          DEFAULT 15,
                        profiles                SEQUENCE {
                            profile0x0006           BOOLEAN
                        },
                        drb-ContinueROHC        ENUMERATED { true }         OPTIONAL
                    },
                    ...
                },
                integrityProtection     ENUMERATED { enabled }              OPTIONAL,
                statusReportRequired    ENUMERATED { true }                 OPTIONAL,
                outOfOrderDelivery      ENUMERATED { true }                 OPTIONAL
            }
nc-Activation                   BOOLEAN                                     OPTIONAL,
nc-Config                       SEQUENCE {                                  OPTIONAL,
    nc-Mode                         ENUMERATED {ca, mc},
    nc-NumChannel                   INTEGER (1..8),
    nc-Scheme                       ENUMERATED {sch1, sch2, sch3, sch4, sch5, sch6},
    nc-CoeffList                    SEQUENCE ((SIZE (1..32)) OF nc-CoeffValue,
    nc-CoeffValue                   BIT STRING (SIZE (8)),
    nc-CoeffMapping                 SEQUENCE {
        nc-Channel1                     BIT STRING (SIZE (8)),
        nc-Channel2                     BIT STRING (SIZE (8)),
...
}
```

In this example, the NC activation and configuration information parameters are composed of:

nc-Activation: a boolean to indicate if NC shall be activated or not;

nc-Config gathering the following NC parameters:

nc-Mode: a value out of a plurality of possible values indicating the transmission mode (Carrier Aggregation or Multi-Connectivity);

nc-NumChannel: an integer number indicating the number of RLC channel used for NC;

nc-Scheme: a value out of a plurality of possible values indicating the NC scheme to apply. This format assumes that both base station and UE are sharing the same understanding of which NC scheme corresponds to each possible value. In particular, the NC scheme may identify the number of PDUs to be combined together in each linear combination;

nc-CoeffList: a list of coefficient values nc-CoeffValue (for instance 8 bits each in a Galois Field 256). The maximum number of coefficients is a constant (for instance 32). As example, assuming that no more than 4 different PDUs can be combined together in the various NC schemes, then the first linear combination uses coefficients belonging to the first set (coefficients from 1 up to 4), the second linear combination uses coefficients belonging to the second set (coefficients from 5 up to 8), etc . . . ;

nc-Coeff Mapping: a list of RLC channel classified in increasing order of the logical channel identity. The number of elements of this list is indicated by the parameter nc-NUMChannel. The value is a bit string where each bit (Boolean) is associated to one linear combination (i.e. to one set of coefficients). If the value is true, the linear combination is transmitted over this channel.

This is a non-limitative example, other formats and combinations of parameters are possible.

Any step of the algorithms of the invention may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

Each of the embodiments of the invention described above can be implemented solely or as a combination of a plurality of the embodiments. Also, features from different embodiments can be combined where necessary or where the combination of elements or features from individual embodiments in a single embodiment is beneficial.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of wireless communication between a base station and a user equipment, wherein the method comprises:
transmitting, by the base station, a data radio bearer configuration; and
transmitting packets according to the data radio bearer configuration between the base station and the user equipment;
wherein:
the data radio bearer configuration comprises a network coding configuration;
the transmitted packets are transmitted according to the network coding configuration; and wherein:
a predefined mapping of network coding coefficient values to logical channels is applied when the network coding configuration does not comprise any information related to the mapping of network coding coefficient values to the logical channels; or
the network coding configuration includes information related to the mapping of network coding coefficient values to logical channels.

2. The method of claim 1, wherein the network coding configuration is embedded inside one or more network coding encoded packets.

3. The method of claim 1, wherein the method further comprises:
receiving by the base station of a configuration acknowledge message to acknowledge the configuration by the user equipment; and
initiating packet transmission according to the network coding configuration upon reception of the configuration acknowledge message.

4. The method of claim 1, wherein the network coding configuration comprises an indication on network coding activation status.

5. The method of claim 4, wherein the network coding activation status is an activation command or a deactivation command.

6. The method of claim 1, wherein the network coding configuration comprises an indication related to the transmission mode to be applied for transmitting packets according to the network coding.

7. The method of claim 6, wherein the transmission mode is multi-radio connectivity.

8. The method of claim 6, wherein the transmission mode is carrier aggregation.

9. The method of claim 1, wherein the network coding configuration comprises an information related to the number of logical channels to be used for transmitting packets according to the network coding.

10. The method of claim 1, wherein the network coding configuration comprises an information related to the network coding scheme to be used for transmitting packets according to the network coding.

11. The method of claim 1, wherein the network coding configuration comprises an information related to the network coding coefficient values to be used for transmitting packets according to the network coding.

12. The method of claim 11, wherein the information related to the network coding coefficient values comprises an information related to the number of network coding coefficient values to be used for transmitting packets according to the network coding.

13. The method of claim 1, wherein predefined network coding coefficient values are used to perform network coding when the network coding configuration does not comprise any information related to the network coding coefficient values.

14. The method of claim 1, wherein the method further comprises:
selecting of logical channels to be used for network coding.

15. The method of claim 1, wherein the method further comprises:
selecting between carrier aggregation and multi-radio connectivity as a transmission mode for transmitting packets according to the network coding configuration.

16. The method of claim 1, wherein the method further comprises:
selecting a plurality of network coding schemes to be used for transmitting packets according to the network coding configuration.

17. The method of claim 1, wherein the method further comprises:
  setting of a plurality of radio link control entities associated with logical channels.

18. A system of wireless communication between a base station and a user equipment, wherein the base station and the user equipment comprise processors configured for:
  transmitting, by the base station, a data radio bearer configuration; and
  transmitting packets according to the data radio bearer configuration between the base station and the user equipment;
  wherein:
  the data radio bearer configuration comprises a network coding configuration;
  the transmitted packets are transmitted according to the network coding configuration; and wherein:
  a predefined mapping of network coding coefficient values to logical channels is applied when the network coding configuration does not comprise any information related to the mapping of network coding coefficient values to the logical channels; or
  the network coding configuration includes information related to the mapping of network coding coefficient values to logical channels.

19. A non-transitory computer-readable storage medium storing instructions of a computer program for implementing a method according to claim 1.

20. A base station device for wireless communication between the base station and a user equipment, wherein the base station device comprises a processor configured for:
  transmitting, to the user equipment, a data radio bearer configuration; and
  exchanging packets according to the data radio bearer configuration with the user equipment;
  wherein:
  the data radio bearer configuration comprises a network coding configuration;
  the exchanged packets are transmitted according to the network coding configuration; and wherein:
  a predefined mapping of network coding coefficient values to logical channels is applied when the network coding configuration does not comprise any information related to the mapping of network coding coefficient values to the logical channels; or
  the network coding configuration includes information related to the mapping of network coding coefficient values to logical channels.

21. A user equipment device for wireless communication between a base station and the user equipment, wherein the user equipment device comprises a processor configured for:
  receiving, from the base station, a data radio bearer configuration; and
  exchanging packets according to the data radio bearer configuration with the base station;
  wherein:
  the data radio bearer configuration comprises a network coding configuration;
  the exchanged packets are transmitted according to the network coding configuration; and wherein:
  a predefined mapping of network coding coefficient values to logical channels is applied when the network coding configuration does not comprise any information related to the mapping of network coding coefficient values to the logical channels; or
  the network coding configuration includes information related to the mapping of network coding coefficient values to logical channels.

* * * * *